United States Patent
Koizumi

(10) Patent No.: US 12,494,148 B2
(45) Date of Patent: Dec. 9, 2025

(54) CALIBRATION DEVICE, DISPLAY DEVICE, CALIBRATION METHOD, AND IMAGE DISPLAY METHOD

(71) Applicant: Sony Interactive Entertainment Inc., Tokyo (JP)

(72) Inventor: Makoto Koizumi, Saitama (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/721,720

(22) PCT Filed: Dec. 21, 2022

(86) PCT No.: PCT/JP2022/047173
§ 371 (c)(1),
(2) Date: Jun. 19, 2024

(87) PCT Pub. No.: WO2023/136072
PCT Pub. Date: Jul. 20, 2023

(65) Prior Publication Data
US 2025/0061831 A1 Feb. 20, 2025

(30) Foreign Application Priority Data
Jan. 17, 2022 (JP) .................. 2022-005228

(51) Int. Cl.
*G09G 3/20* (2006.01)
*G01J 3/50* (2006.01)
(Continued)

(52) U.S. Cl.
CPC ............ *G09G 3/2003* (2013.01); *G01J 3/506* (2013.01); *G06F 3/013* (2013.01); *G09G 3/001* (2013.01);
(Continued)

(58) Field of Classification Search
CPC ................ G09G 3/2003; G09G 3/001; G09G 2320/0666; G09G 2320/0693;
(Continued)

(56) References Cited

U.S. PATENT DOCUMENTS 10,140,695 B2  11/2018  Wilson
10,410,590 B2   9/2019  Comps
(Continued)

FOREIGN PATENT DOCUMENTS

JP  2008058776 A  3/2008
JP  2009003128 A  1/2009
(Continued)

OTHER PUBLICATIONS

Notice of Reasons for Refusal for corresponding JP Application No. 2022-005228, 10 pages, dated Jan. 10, 2025.
(Continued)

*Primary Examiner* — Chanh D Nguyen
*Assistant Examiner* — Gloryvid Figueroa-Gibson
(74) *Attorney, Agent, or Firm* — Kilpatrick Townsend & Stockton LLP

(57) ABSTRACT

A head mounted display includes a first display unit for displaying an image of a center part of a display image and a second display unit for displaying an image of the outside thereof, and the images are combined by a half mirror for visual recognition. On the basis of the chromaticities of the first display unit and the second display unit measured by a chromoscope from a position similar to the viewpoint of a user, a calibration device calculates a color conversion matrix by which colors in a common color gamut are visually recognized, and outputs it in association with the display unit.

20 Claims, 12 Drawing Sheets

(51) Int. Cl.
*G06F 3/01* (2006.01)
*G09G 3/00* (2006.01)
(52) U.S. Cl.
CPC ............ *G09G 2320/0666* (2013.01); *G09G 2320/0693* (2013.01); *G09G 2354/00* (2013.01)
(58) Field of Classification Search
CPC ........ G09G 2354/00; G09G 3/20; G09G 5/00; G09G 5/02; G09G 5/36; G09G 5/37; G09G 5/377; G01J 3/506; G06F 3/013; G02B 27/02; H04N 5/64; H04N 13/324; H04N 13/327; H04N 13/344; H04N 13/366; H04N 17/04

See application file for complete search history.

(56) References Cited

U.S. PATENT DOCUMENTS

| | | | |
|---|---|---|---|
| 2002/0041393 A1* | 4/2002 | Takahashi | H04N 1/6058 358/1.9 |
| 2010/0060911 A1* | 3/2010 | Marcu | G09G 5/02 358/1.9 |
| 2012/0050505 A1 | 3/2012 | Yabui et al. | |
| 2018/0096471 A1* | 4/2018 | Wilson | G02B 27/0172 |
| 2018/0204525 A1 | 7/2018 | Comps | |
| 2020/0064631 A1 | 2/2020 | Robbins | |
| 2021/0097943 A1 | 4/2021 | Wyatt | |
| 2023/0053481 A1* | 2/2023 | Ichikawa | A61B 3/066 |

FOREIGN PATENT DOCUMENTS

| | | |
|---|---|---|
| JP | 2009115906 A | 5/2009 |
| JP | 2012242419 A | 12/2012 |
| WO | 2016207686 A1 | 12/2016 |
| WO | 2017183582 A1 | 10/2017 |
| WO | 2018150722 A1 | 8/2018 |

OTHER PUBLICATIONS

International Search Report for corresponding PCT Application No. PCT/JP2022/047173, 6 pages, dated Mar. 20, 2023.

* cited by examiner

| STATE OF PUPIL | FIRST STATE | SECOND STATE | THIRD STATE | ... |
|---|---|---|---|---|
| FIRST DISPLAY UNIT | CMAT_A1(1) | CMAT_A1(2) | CMAT_A1(3) | ... |
| SECOND DISPLAY UNIT | CMAT_A2(1) | CMAT_A2(2) | CMAT_A2(3) | ... |

CALIBRATION DEVICE, DISPLAY DEVICE, CALIBRATION METHOD, AND IMAGE DISPLAY METHOD

TECHNICAL FIELD

The present invention relates to a calibration device of a display device, a display device for displaying an image using information obtained by calibration, a calibration method, and an image display method.

BACKGROUND ART

An image display system in which a target space can be appreciated from a free viewpoint has been spread. For example, a system in which a panoramic video is displayed on a head mounted display and, when a user wearing the head mounted display rotates his/her head, a panoramic image corresponding to the viewing direction is displayed has been developed. By using the head mounted display, it is possible to enhance a sense of immersion in the video and improve the operability of applications such as games. In addition, a walk-through system that allows a user wearing a head mounted display to be able to virtually walk around in a space displayed as a video by physically moving has also been developed.

In order to enhance the quality of video experience, it is required to express images with a wide visual field with high definition. However, as the resolution and the viewing angle are expanded, the data size of the image to be processed increases, and as a result of the time required for processing and transfer, a delay is likely to occur before display. Accordingly, a technique has been proposed that utilizes the human visual characteristics in which the eyesight deteriorates at a farther point from the center of the visual field, provides a difference in image resolution between the center region and the outside thereof, and reduces processing waste while maintaining visual image quality (see, for example, PTL 1).

CITATION LIST

Patent Literature

[PTL 1] U.S. patent Ser. No. 10/140,695

SUMMARY

Technical Problem

In the field of the image display technique which is not limited to the head mounted display, it is always a common challenge to allow displaying a fine image with a wide visual field at a low delay. For example, in a case of the technique of PTL 1, displays are separately provided in a center region and in the other regions to provide a clear difference in the display resolution, thereby facilitating the appropriate distribution of processing resources. On the other hand, even a subtle difference in the color characteristics of an image displayed on an individual display panel may cause a problem in which the boundary line appears unnatural and gives discomfort to a user.

The present invention has been made in view of such problems, and an object thereof is to provide a technique capable of easily visually recognizing a high-definition and wide-visual-field image without discomfort.

Solution to Problem

An aspect of the present invention relates to a calibration device. The calibration device is a calibration device that performs calibration of a display device for individually displaying partial images obtained by dividing a display image into regions and combining them for visual recognition, and includes a chromaticity information acquisition unit that acquires information on a chromaticity measured for each of a plurality of display mechanisms that displays the partial images, a color conversion matrix acquisition unit that determines a common color gamut included in color gamuts of the plurality of display mechanisms on the basis of the information on the chromaticity and acquires a color conversion matrix for converting pixel values of image data for each of the plurality of display mechanisms such that the partial images are represented by the common color gamut, and an output unit that outputs the color conversion matrix in association with the display mechanism.

Another aspect of the present invention relates to a display device. The display device is a display device that individually displays partial images obtained by dividing a display image into regions and combining them for visual recognition, and includes a color conversion matrix storage unit that stores a color conversion matrix for converting pixel values of image data in association with a display mechanism such that the partial images are represented by a common color gamut included in color gamuts of a plurality of the display mechanisms of display destinations, a color conversion unit that converts pixel values of data of the partial image by using the color conversion matrix associated with the display mechanism of the display destination, and an image output unit that allows the corresponding display mechanism to display the data of the partial image with the pixel values converted.

Yet another aspect of the present invention is a calibration method. The calibration method is a calibration method of a calibration device that performs calibration of a display device for individually displaying partial images obtained by dividing a display image into regions and combining them for visual recognition, and includes a step of acquiring information on a chromaticity measured for each of a plurality of display mechanisms that displays the partial images, a step of determining a common color gamut included in the color gamuts of the plurality of display mechanisms on the basis of the information on the chromaticity and acquiring a color conversion matrix for converting pixel values of image data for each of the plurality of display mechanisms such that the partial images are represented by the common color gamut, and a step of outputting the color conversion matrix in association with the display mechanism.

Yet another aspect of the present invention is an image display method. The image display method is an image display method of a display device that individually displays partial images obtained by dividing a display image into regions and combining them for visual recognition, and includes a step of reading a color conversion matrix associated with a display mechanism of a display destination from a storage unit for storing the color conversion matrix for converting pixel values of image data in association with the display mechanism such that the partial images are represented by a common color gamut included in the color gamuts of a plurality of display mechanisms of the display destinations, and converting the pixel values of the data of the partial image by using the same, and a step of allowing the corresponding display mechanism to display the data of the partial image with the pixel values converted.

It should be noted that given combinations of the above constitutional elements and an expression obtained by converting an expression of the present invention between methods, devices, systems, computer programs, recording media recording computer programs, and the like is also effective as a mode of the present invention.

Advantageous Effect of Invention

According to the present invention, a high-definition and wide-visual-field image can be easily visually recognized without discomfort.

DESCRIPTION OF EMBODIMENT

The present embodiment relates to a display system for visually recognizing one image by combining partial images displayed by different display mechanisms. Such examples include, in addition to the head mounted display as disclosed in PTL 1, a mode in which a plurality of flat plate displays is arranged side by side to form a single large screen, and a mode in which large-scale projection mapping is realized using a plurality of projectors. Although the display format to which the present embodiment can be applied is not limited as described above, a head mounted display will be mainly described below as an example.

Figure 1:
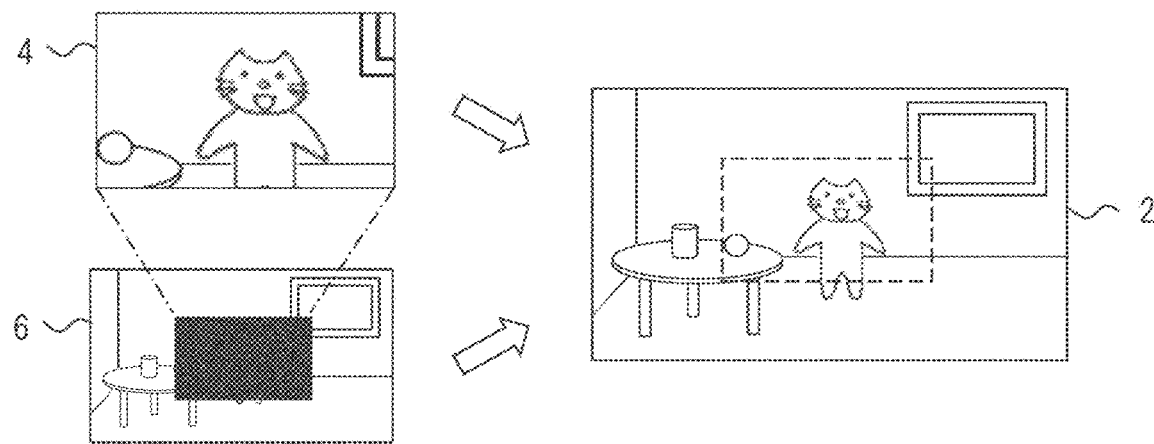
FIG. 1 is a diagram for exemplifying a display mode of an image to which the present embodiment can be applied.

FIG. 1 exemplifies a display mode of images to which the present embodiment can be applied. In this example, an image 2 represents one frame of a moving image. A center image 4 represents a region of a predetermined size including the center of the image plane in the image 2, and a peripheral image 6 represents a region outside the center image 4. In the present embodiment, the center image 4 and the peripheral image 6 are individually displayed on different display mechanisms, for example, two display panels.

For example, the display panel displaying the center image 4 is higher in resolution than the display panel displaying the peripheral image 6. By arranging the display panels such that both images are combined and visually recognized as the image 2, it is possible to display an image having high definition in the center part and a wide visual field.

As visual characteristics of a general person, a region corresponding to a region within 5° with the visual line from the pupil to the gaze point assumed as the central axis is called a discriminative visual field where visual functions such as eyesight are excellent. In addition, a region within approximately 30° in the horizontal direction and approximately 20° in the vertical direction is called an effective visual field where information can be instantly received by eyeball movement alone. Further, as the visual field is further away from the gaze point, the discriminating ability of information becomes lower such that a region corresponding to a region within 60° to 90° in the horizontal direction and 45° to 70° in the vertical direction is a stable field of fixation and a region corresponding to a region within 100° to 200° in the horizontal direction and 85° to 130° in the vertical direction is an auxiliary visual field.

In a case of a head mounted display, the gaze points tend to gather near the center of the image. Therefore, when the center region is prioritized to be displayed in high definition, the load of data processing and the required amount of resources can be reduced, and an image with a wide angle of view can be displayed with a low delay without greatly deteriorating the visual image quality as compared with displaying the whole region in high definition. In addition, by separating the display panels, it is possible to select products with sufficient performance necessary for displaying each image and to optimize the manufacturing cost for the whole head mounted display. However, the rules of image division, the number of divisions, and the resolution to be set in the present embodiment are not limited thereto.

Figure 2:
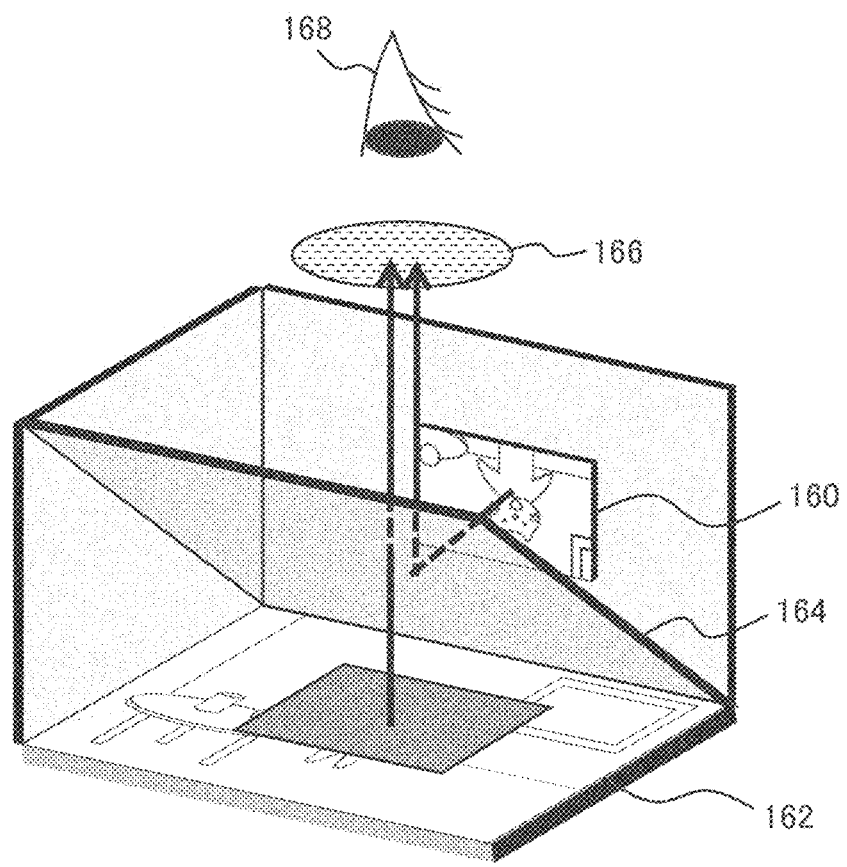
FIG. 2 is a perspective view for depicting an example of a mechanism for combining a center image and a peripheral image for visual recognition in the mode of FIG. 1.

FIG. 2 is a perspective view for depicting an example of a mechanism for combining the center image and the peripheral image to be visually recognized in the mode of FIG. 1. This example is configured in such a manner that a first display panel 160 for displaying the center image and a second display panel 162 for displaying the peripheral image are arranged such that the angle formed by the screens is 90°, and then a half mirror 164 is arranged in the middle so as to form 450 with each other. The half mirror 164 may be a general one that allows a predetermined proportion of the incident light to pass through and reflects the remaining light.

A part of the light from the first display panel 160 is reflected by the half mirror 164 and enters an eye 168 of a user through an eyepiece 166. A part of the light from the second display panel 162 passes through the half mirror 164 and enters the eye 168 of the user through the eyepiece 166. By properly aligning the first display panel 160, both are combined and visually recognized as one image by the user.

As described above, the main purpose of dividing the image in this mode is to display (or to allow the user to visually recognize) the center image with higher resolution than the peripheral image. In this context, the display systems of the first display panel 160 and the second display panel 162 are not particularly limited, but the former may be, for example, a micro organic light emitting display (MOLED) having a small size and high resolution. In addition, the latter may be a large and relatively inexpensive liquid crystal panel or an active matrix organic light emitting display (AMOLED).

In a case where the display panels having different degrees of resolution are combined in this manner, the boundary line can be made inconspicuous by processing on the image data such that the degrees of resolution are smoothly connected at the boundary between the center image and the peripheral image. On the other hand, the problem related to the boundary between the two images can also be caused by the difference between the color tones expressed by the respective display panels.

Figure 3:
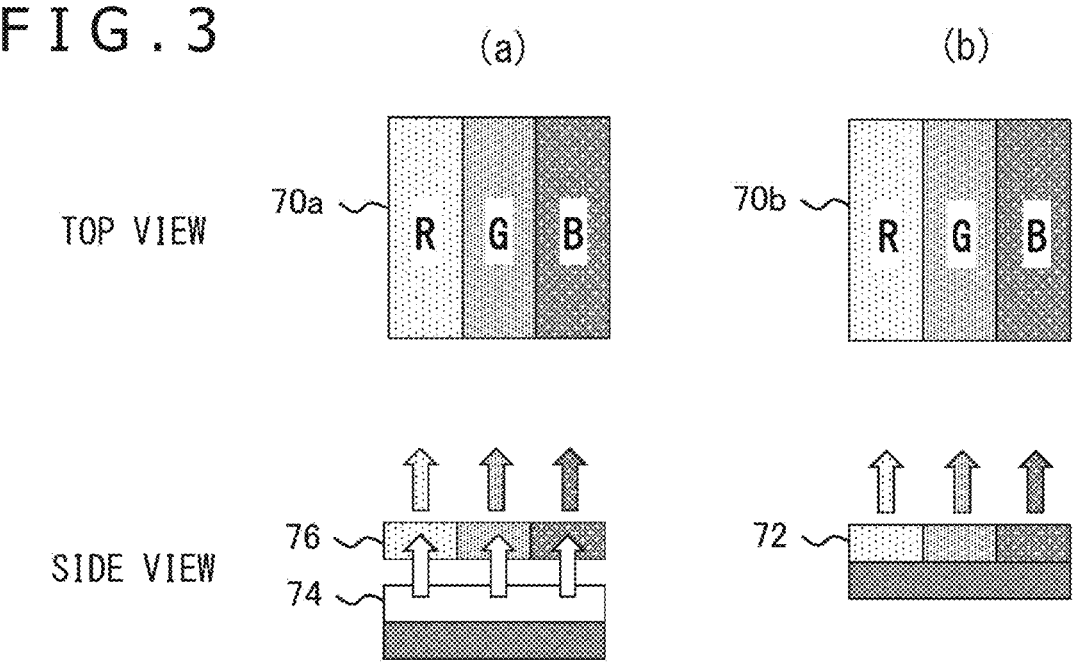
FIG. 3 depicts diagrams for explaining the difference between the light emitting systems of organic EL (Electroluminescence) displays that can be used in the present embodiment.

FIG. 3 depicts diagrams for explaining the difference between the light emitting systems of organic EL displays that can be used in the present embodiment. Each of the upper stages of (a) and (b) schematically depicts a top view of an element for one pixel of the MOLED and the AMOLED, respectively, and each of the lower stages schematically depicts a cross-sectional view thereof. In a case of the MOLED depicted in (a), light from a white organic light emitting layer 74 is allowed to pass through a color filter 76 having three primary colors of red (R), green (G), and blue (B), so that the light emission of RGB configuring one pixel 70*a* is realized. In a case of the AMOLED depicted in (b), light from a self-emitting layer 72 in each primary color realizes the light emission of one pixel 70*b*.

Due to such a difference between the light emitting systems, even if the pixel values on the image data are the same, a difference between the color tones to be expressed may be generated. Accordingly, the boundary of the combined images is conspicuous, and there is a possibility that the difference between the color tones is visually recognized as a boundary line especially when one continuous object crosses the boundary. This problem may be caused by an individual difference in the manufacturing stage and the secular change, even if the display panels have the same light emitting system or even if the displays are of a projector or a laser scanning system. Therefore, in the present embodiment, the difference between the color tones of the display images caused by a plurality of display mechanisms used in combination is reduced, and the display images are visually recognized as one image without any discomfort.

Figure 4:
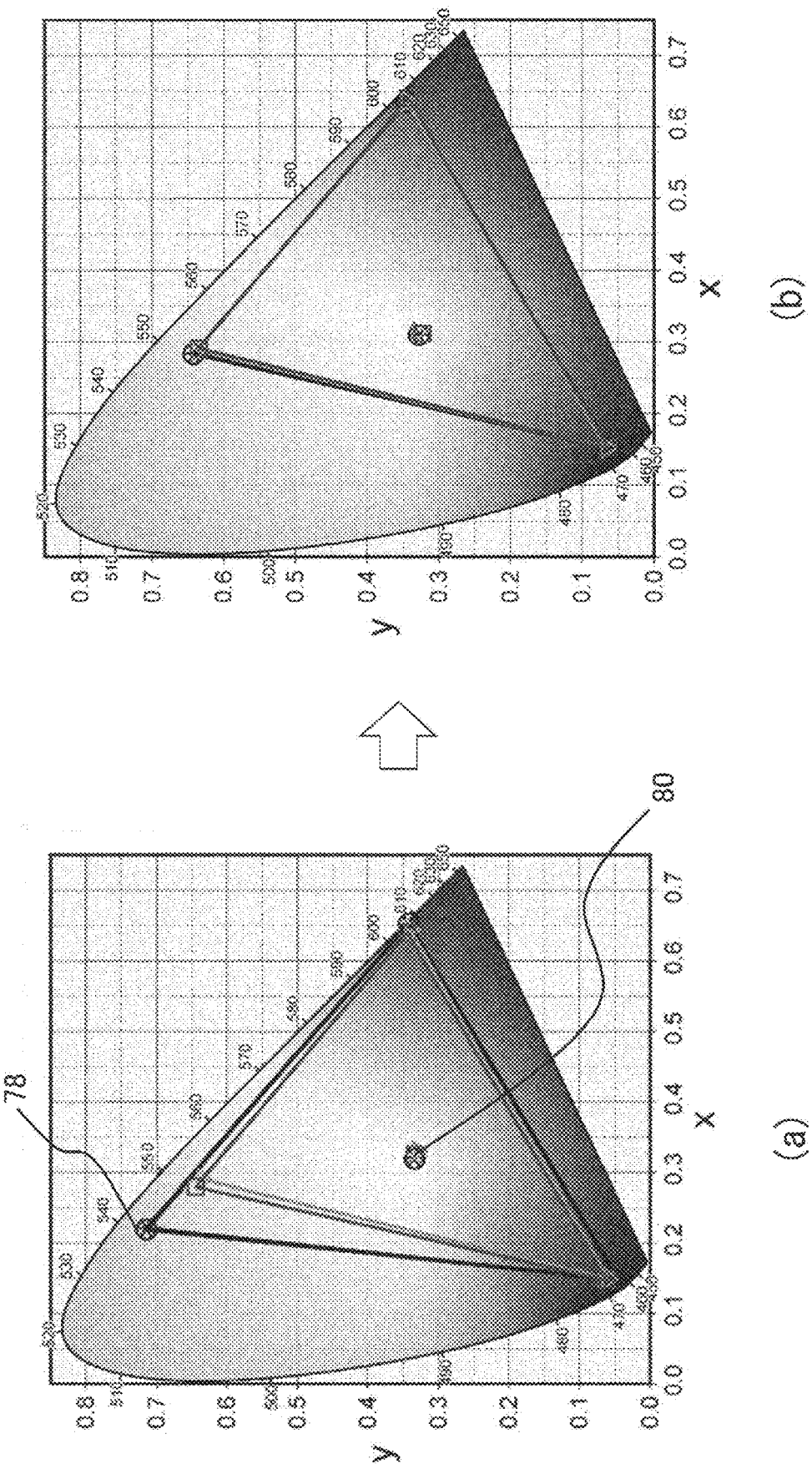
FIG. 4 depicts diagrams each explaining the action of the present embodiment by using an xy chromaticity diagram.

An xy chromaticity diagram has been known as one of the indexes for quantifying color tones. FIG. 4 depicts diagrams each explaining the action of the present embodiment by using the xy chromaticity diagram. The xy chromaticity diagram is data representing a color by a two-dimensional coordinate of (x, y) among the color mixing ratios in the XYZ color system independent of a display device. That is, different coordinates in the chromaticity diagram represent colors that are visually different from each other. In the xy chromaticity diagrams depicted in (a) and (b), a horseshoe-shaped region is a region of a chromaticity that can be recognized by a person, and a plurality of triangular regions represented therein is color gamuts that can be represented by display panels that are different from each other.

An apex (for example, an apex 78) of the triangle indicates the chromaticity when the primary color is represented, and the vicinity of the center of gravity of the triangle is a white color point (for example, a white color point 80) that is the chromaticity when the white color is represented. In the display panel whose color gamut is deviated as depicted in (a), there is a slight difference in all colors represented by mixed colors. Therefore, in the present embodiment, color conversion is performed on the image data by a color conversion matrix obtained for each display panel, so that the color gamut of the display result is made common as depicted in (b). Specifically, in the calibration stage, a common color gamut included in all the color gamuts of a plurality of display panels used in combination is first set.

Then, a color conversion matrix is calculated on the basis of the relation between the original color gamut of each display panel and the common color gamut, and is stored in association with each display panel. When the image is displayed, the RGB value that is the data of the image is converted by the color conversion matrix for each display panel, and then is used as the input value of the panel drive. For example, by converting the red colors of the first display panel and the second display panel into the red color of the common color gamut by the respective color conversion matrices, both can express the same red color.

Figure 5:
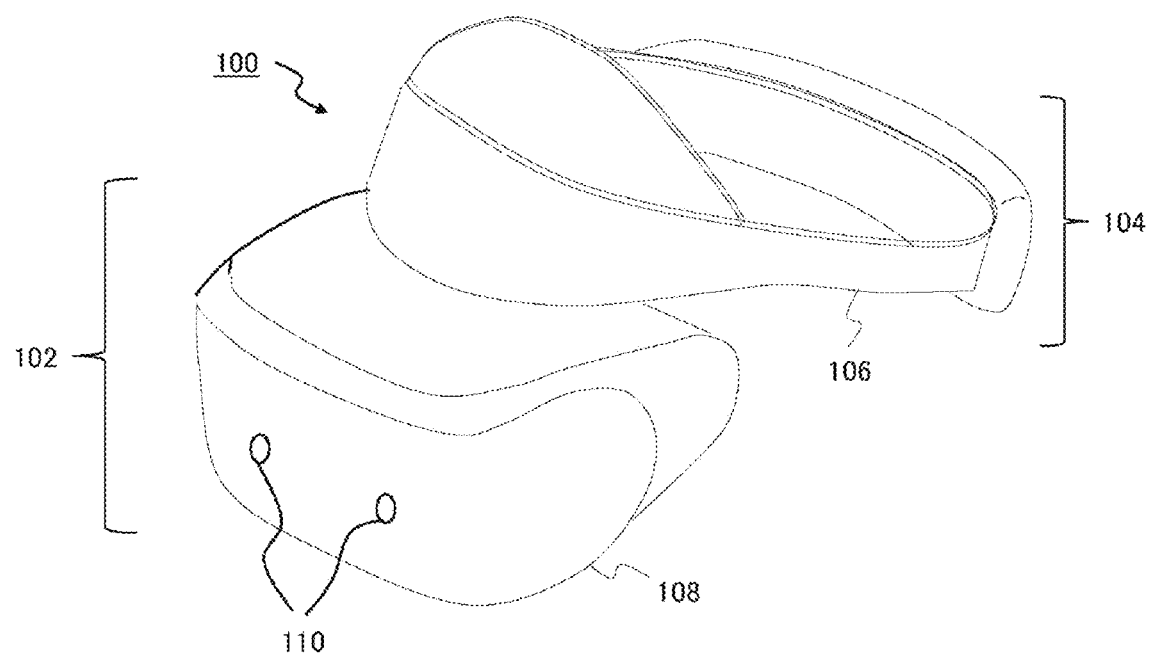
FIG. 5 is a diagram for depicting an appearance example of a head mounted display according to the present embodiment.

FIG. 5 depicts an appearance example of a head mounted display according to the present embodiment. In this example, a head mounted display 100 is configured using an output mechanism unit 102 and a wearing mechanism unit 104. The wearing mechanism unit 104 includes a wearing band 106 that realizes fixing of the device when it is worn by the user and makes one turn around the head. The output mechanism unit 102 includes a housing 108 having a shape so as to cover the left and right eyes in a state where the user wears the head mounted display 100, and includes therein a plurality of display mechanisms capable of individually displaying images.

The inside of the housing 108 further includes a mechanism for combining and visualizing a plurality of displayed images and an eyepiece for enlarging the viewing angle. Stereoscopic vision may be realized by displaying stereo images having parallax on the respective left and right eyes. The inside of the housing 108 may further include a gaze point detector for detecting the gaze point of the user for the displayed image.

The head mounted display 100 may further include speakers or earphones at positions corresponding to the ears of the user when being worn. In this example, the head mounted display 100 includes stereo cameras 110 on the front surface of the housing 108, and moving pictures of the surrounding real space are photographed with a visual field corresponding to the visual line of the user. Further, the head mounted display 100 may include, inside or outside the housing 108, one of various sensors, such as an acceleration sensor, a gyroscopic sensor, a geomagnetic sensor, and a GPS (Global Positioning System), to derive the movement, posture, position, and the like of the head mounted display 100.

Figure 6:
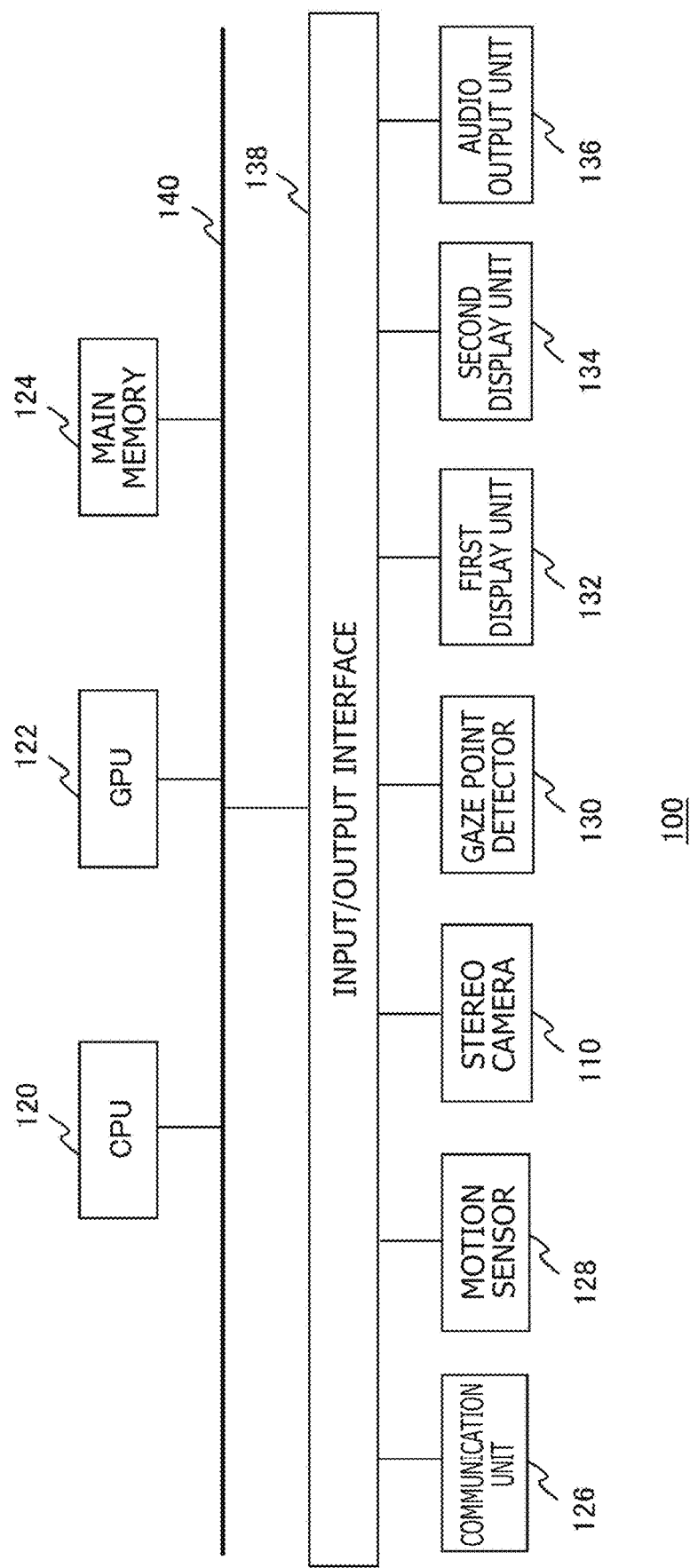
FIG. 6 is a diagram for depicting an internal circuit configuration of the head mounted display according to the present embodiment.

FIG. 6 depicts an internal circuit configuration of the head mounted display 100. The head mounted display 100 includes a CPU (Central Processing Unit) 120, a GPU (Graphics Processing Unit) 122, and a main memory 124. These units are connected to each other through a bus 140. An input/output interface 138 is further connected to the bus 140. A communication unit 126, a motion sensor 128, a stereo camera 110, a gaze point detector 130, a first display unit 132, a second display unit 134, and an audio output unit 136 are connected to the input/output interface 138.

The CPU 120 controls the whole head mounted display 100 by executing an operating system stored in the main memory 124. The CPU 120 also executes various programs downloaded through the communication unit 126 and reproduces electronic content. The GPU 122 has a function of a geometry engine and a function of a rendering processor, draws a display image according to a drawing command from the CPU 120, and outputs it to the first display unit 132 and the second display unit 134.

The main memory 124 is configured using a RAM (Random Access Memory) and stores programs and data necessary for processing by the CPU 120 and the like. The communication unit 126 is a network interface such as a wired or wireless LAN (Local Area Network) or Bluetooth (registered trademark), and realizes communication with an external device. The motion sensor 128 is configured using at least one of sensors, such as an acceleration sensor, a gyroscopic sensor, a geomagnetic sensor, and a GPS, and measures the position, posture, and movement of the head mounted display 100 and the head of the user wearing the same.

As depicted in FIG. 5, the stereo cameras 110 are a pair of video cameras for photographing the surrounding real space from the left and right viewpoints with a visual field corresponding to the viewpoint of the user. If the moving image photographed by the stereo cameras 110 is divided into regions and immediately displayed on the first display unit 132 and the second display unit 134, what is called video see-through in which the state of the real space in the direction where the user is directed can be seen as it is can be realized. Further, if a virtual object is drawn on a real object image appearing in a photographed image, augmented reality can be realized. In addition, by analyzing the image photographed by the stereo cameras 110 with a known technique such as Visual SLAM (Simultaneous Localization and Mapping), the position and posture of the head mounted display 100 and the head of the user can be tracked.

By integrating the analysis result of the photographed image with the measurement result of the motion sensor 128, the movement of the user head may be acquired with higher accuracy. Accordingly, a display image in the visual field according to the movement of the head can be generated with high accuracy, and a sense of immersion in the video world can be enhanced. In addition, the movement of the head of the user can be accepted as a user operation for content, and processing can be accordingly branched.

The gaze point detector 130 detects, at a predetermined rate, the position coordinate of the gaze point of the user who is viewing the images represented by the first display unit 132 and the second display unit 134. The gaze point detector 130 is configured using, for example, a mechanism for irradiating the eyeballs with infrared rays and a camera for photographing the reflected light thereof, and tracks a point on the image at which the user is gazing, by specifying the orientation of the pupil from the photographed image. In addition, various techniques have been put into practical use as means for detecting a gaze point, and any of them may be employed in the present embodiment.

The first display unit 132 displays an image of a region of a predetermined size including the center of the image plane, that is, a center image. The second display unit 134 displays an image of a region outside the center image, that is, a peripheral image. It should be noted that the display means as the first display unit 132 and the second display unit 134 is not limited to display panels provided with light emitting elements, and laser scanning or the like may be used as described later. In addition, as described above, the number of display units to be combined, the positional relation, and the high/low relation of resolution in the present embodiment are not limited.

Hereinafter, each of the display mechanisms such as display panels used in combination will be simply referred to as a "display unit" in some cases. The first display unit 132 and the second display unit 134 display the center image and the peripheral image generated by the GPU 122 at a predetermined rate, respectively. The images displayed by the first display unit 132 and the second display unit 134 are combined by the composition mechanism as exemplified in FIG. 2, and are visually recognized by the user as one display image.

As described above, the head mounted display 100 may realize stereoscopic vision by displaying stereo images for the left and right eyes. In this case, the stereo images are a pair of images obtained by combining the center image and the peripheral image. That is, the first display unit 132 displays a pair of center images, and the second display unit 134 displays a pair of peripheral images. The audio output unit 136 is configured using speakers or earphones provided at positions corresponding to the ears of the user when the head mounted display 100 is worn, and allows the user to hear audio.

It should be noted that some of the functions of the illustrated head mounted display 100 may be provided in an external device that has established communication with the head mounted display 100. For example, at least a part of processing for determining the content of an image to be displayed and an appropriate visual field, processing for accordingly generating data of the center image and the peripheral image and performing color conversion for each display unit, and the like may be performed by an external image generation device or an image providing server connected through a network.

Figure 7:
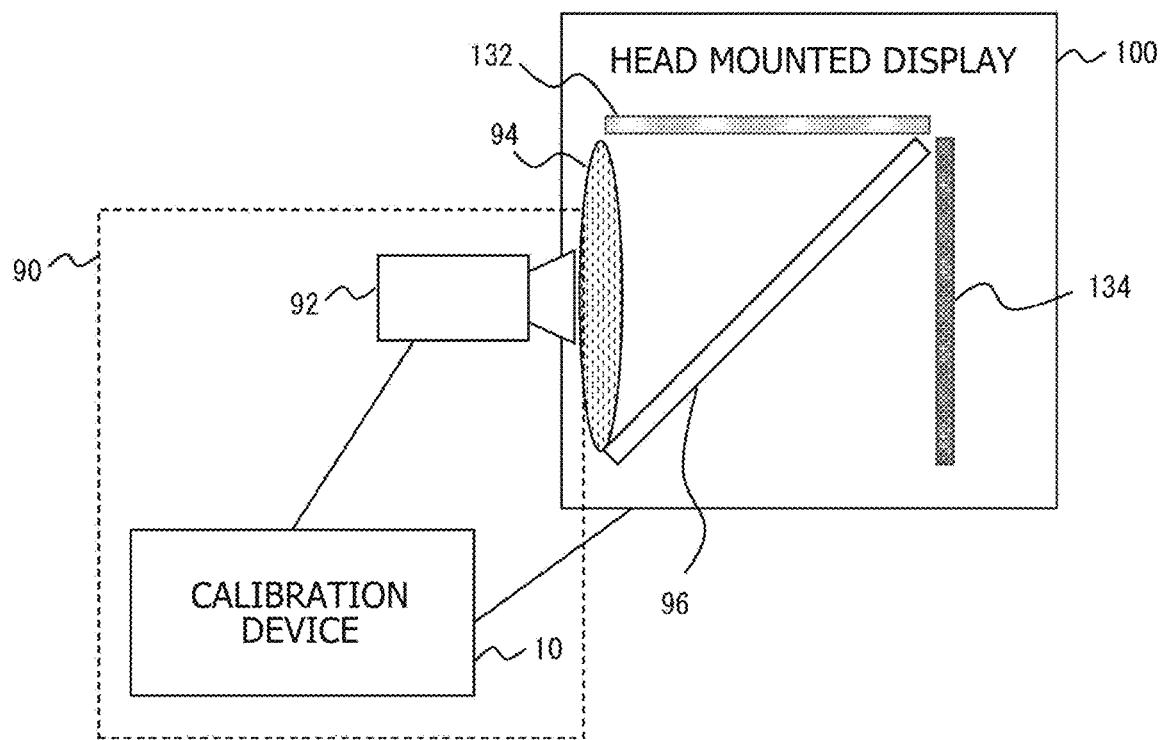
FIG. 7 is a diagram for depicting a configuration of a calibration system for acquiring a color conversion matrix in the present embodiment.

FIG. 7 depicts a configuration of a calibration system for acquiring a color conversion matrix in the present embodiment. A calibration system 90 includes a chromoscope 92 and a calibration device 10. The chromoscope 92 observes the image that is to be calibrated and that is displayed on the head mounted display 100 from a position within a predetermined range that can be regarded as the same as the viewpoint of the user during operation, and measures the chromaticity.

In the illustrated example, the head mounted display 100 has a structure similar to that depicted in FIG. 2. Therefore, the chromoscope 92 measures the chromaticity of the light reflected by the half mirror 96 and having passed through the eyepiece 94 from the first display unit 132. The chromoscope 92 also measures the chromaticity of the light having passed through the half mirror 96 and the eyepiece 94 from the second display unit 134. Therefore, the calibration system 90 may include a jig for fixing the chromoscope 92 at an appropriate position on the head mounted display 100.

The calibration device 10 sequentially displays three-primary-color images and white monochromatic color painted-out images on each of the first display unit 132 and the second display unit 134, and controls the chromoscope 92 such that chromaticity is measured in each state. The calibration device 10 also calculates a color conversion matrix for each of the first display unit 132 and the second display unit 134 on the basis of the measured chromaticity. The color conversion matrix is output in association with identification information of the first display unit 132 and the second display unit 134.

This data is stored in a non-volatile memory, which is not illustrated, or the like of the head mounted display 100, so that it is read during operation and used for conversion of pixel values. The calibration by the calibration system 90 is performed at the time of manufacturing or before shipping of the head mounted display 100. Alternatively, a camera having the function of the chromoscope 92 may be provided on the head mounted display 100 to allow the user to perform calibration in an individual environment. Accordingly, the difference in color tone between the display units caused by secular change can be corrected according to the individual use conditions.

Figure 8:
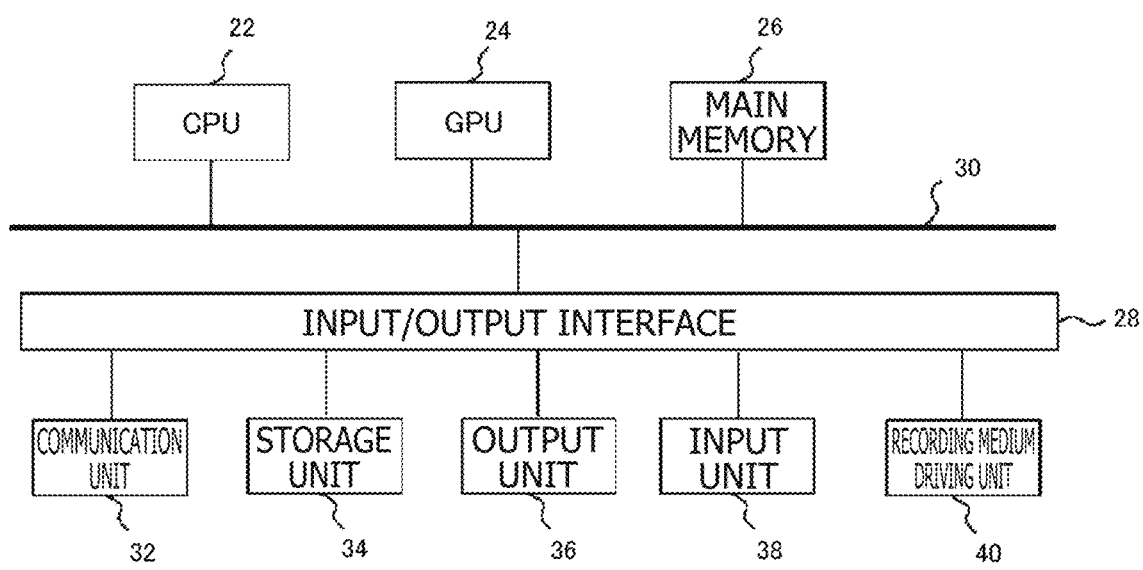
FIG. 8 is a diagram for depicting an internal circuit configuration of a calibration device according to the present embodiment.

FIG. 8 depicts an internal circuit configuration of the calibration device 10. The calibration device 10 includes a CPU (Central Processing Unit) 22, a GPU (Graphics Processing Unit) 24, and a main memory 26. These units are connected to each other through a bus 30. An input/output interface 28 is further connected to the bus 30. A communication unit 32 including a peripheral device interface such as a USB (Universal Serial Bus) or IEEE (Institute of Electrical and Electronics Engineers) 1394 or a wired or wireless LAN network interface is connected to the input/output interface 28.

The calibration device 10 establishes communication with the head mounted display 100 through the communication unit 32, and transmits a display control signal for chromaticity measurement. A storage unit 34 such as a hard disk drive or a non-volatile memory, an output unit 36 for outputting data to an external device such as a monitor, an input unit 38 for inputting data from the chromoscope 92 or an input device that is not illustrated, and a recording medium driving unit 40 for driving a removable recording medium such as a magnetic disk, an optical disk, or a semiconductor memory are also connected to the input/output interface 28.

The CPU 22 controls the whole calibration device 10 by executing an operating system stored in the storage unit 34. The CPU 22 also executes various programs read from a removable recording medium and loaded into the main memory 26 or downloaded through the communication unit 32. In accordance with a drawing command from the CPU 22, the GPU 24 performs image drawing processing for information display as necessary and outputs it to the output unit 36. The main memory 26 is configured using a RAM (Random Access Memory) and stores programs and data necessary for processing.

Figure 9:
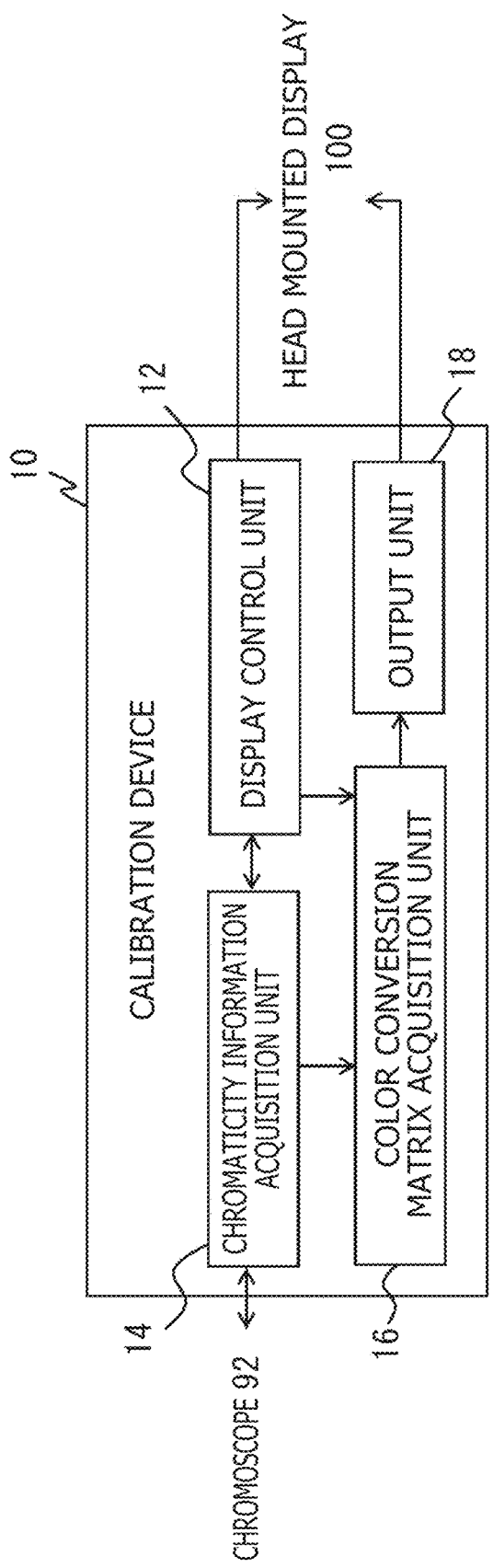
FIG. 9 is a diagram for depicting a configuration of functional blocks of the calibration device in the present embodiment.

FIG. 9 depicts a configuration of functional blocks of the calibration device 10 in the present embodiment. The calibration device 10 includes a display control unit 12 for controlling the display at the time of chromaticity measurement, a chromaticity information acquisition unit 14 for acquiring information related to the chromaticity of each display unit, a color conversion matrix acquisition unit 16 for acquiring a color conversion matrix for each display unit, and an output unit 18 for outputting data of the color conversion matrix.

Each of the functional blocks depicted in FIG. 9 and FIG. 14 that will be described later can be realized by various circuits depicted in FIGS. 6 and 8 in terms of hardware, and is realized by programs loaded from a recording medium into the memory to perform various functions such as an information processing function, an image processing function, a display function, and a communication function in terms of software. Therefore, it will be understood by those skilled in the art that these functional blocks can be realized in a variety of forms by hardware alone, software alone, or a combination thereof, and are not limited to any of them.

The display control unit 12 controls the color to be displayed on each display unit of the head mounted display 100 and the timing, so that a state necessary for measuring chromaticity to obtain a color gamut is created. Specifically, the display control unit 12 sequentially displays images of red, green, and blue serving as the apexes of the color gamut and painted-out images of white serving as the white color point in the xy chromaticity diagram for each display unit. The chromaticity information acquisition unit 14 controls the chromoscope 92 so as to measure chromaticity in each of eight states and sequentially acquires the measurement results.

The chromaticity information acquisition unit 14 also calculates, for each display unit, a conversion matrix for converting an RGB value into an XYZ value that is a display result when the RGB value is used as an input value on the basis of the measurement result of the chromaticity. Hereinafter, this conversion matrix is referred to as an "additive color mixing matrix." The color conversion matrix acquisition unit 16 determines a common color gamut on the basis of the color gamuts of all the display units, and calculates a conversion matrix of RGB for each display unit such that the RGB of the image data becomes a color in the common color gamut as a result of display. This conversion matrix is the "color conversion matrix" described so far.

The output unit 18 outputs the acquired color conversion matrix in association with the identification information of the display unit. The output destination may be the head mounted display 100, a recording medium through the recording medium driving unit 40, an image generation device directly connected to the head mounted display 100, or a management server connected through a network. In any case, the color conversion matrix corresponding to the head mounted display 100 to be used is read during operation, and the pixel values of the image data are converted and displayed on each display unit.

Figure 10:
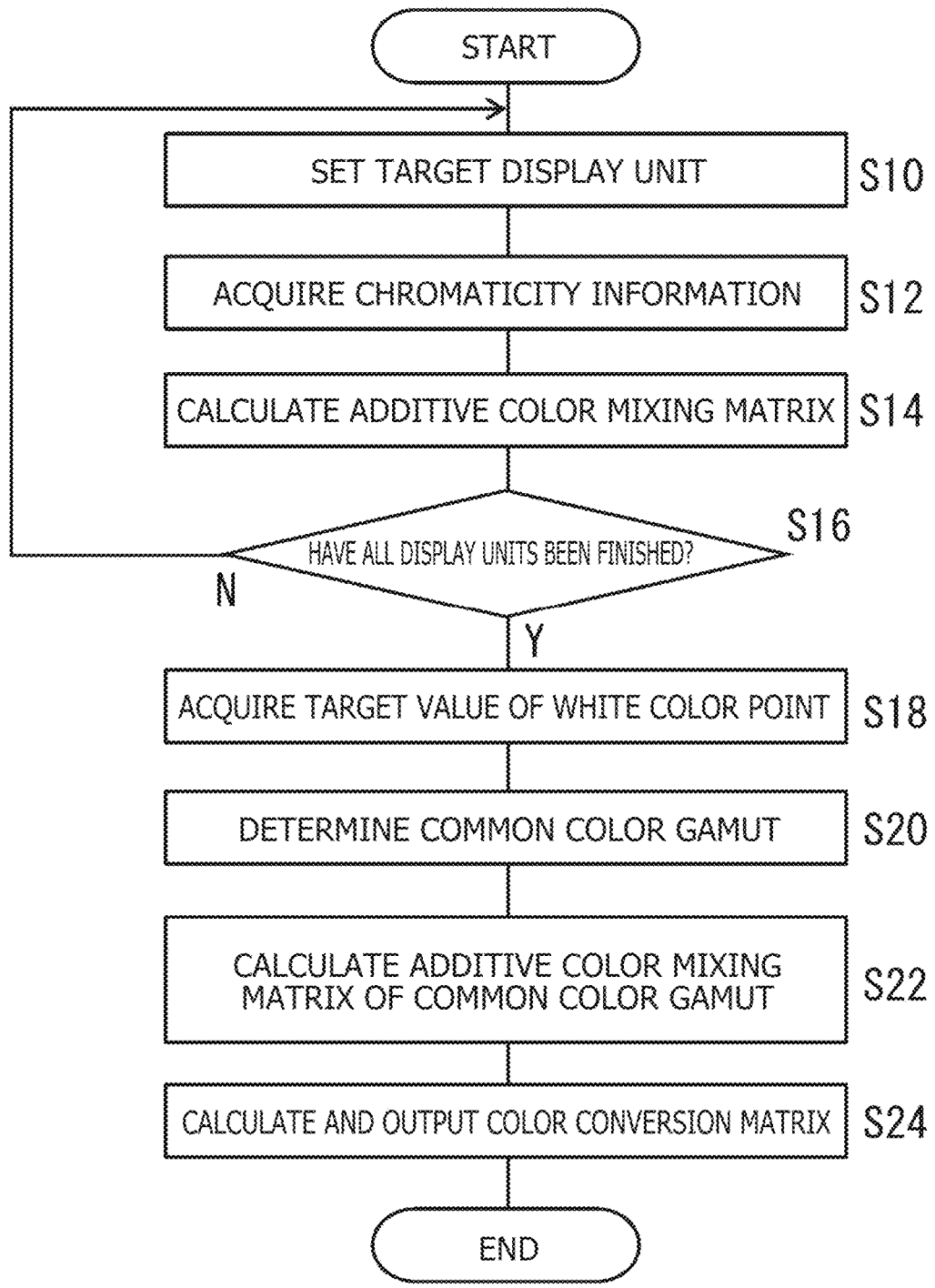
FIG. 10 is a flowchart for depicting a processing procedure in which the calibration device acquires a color conversion matrix corresponding to a display unit of the head mounted display in the present embodiment.

FIG. 10 is a flowchart for depicting a processing procedure in which the calibration device 10 acquires a color conversion matrix corresponding to the display unit of the head mounted display 100. This flowchart is started after the operator of calibration fixes the head mounted display 100 and the chromoscope 92 and performs a calibration start operation by an input device that is not illustrated.

First, the chromaticity information acquisition unit 14 of the calibration device 10 sets one display unit for acquiring chromaticity information among those provided in the head mounted display 100 (S10). Then, the chromaticity information acquisition unit 14 acquires the chromaticities of the three primary colors and the white color in cooperation with the display control unit 12 (S12). When the input to the display unit is N bits, the display control unit 12 sequentially displays an image whose all pixel values are red ($2^N-1$, 0, 0), an image whose all pixel values are green (0, $2^N-1$, 0), an image whose all pixel values are blue (0, 0, $2^N-1$), and an image whose all pixel values are white ($2^N-1$, $2^N-1$, $2^N-1$) on the target display unit.

The chromaticity information acquisition unit 14 controls the chromoscope 92 so as to measure the chromaticity in a state where each image is displayed, and acquires the measurement result. Then, the chromaticity information acquisition unit 14 calculates the additive color mixing matrix on the basis of the measurement result of the chromaticity (S14). The additive color mixing matrix for converting data of the color system of (R, G, B) into data ($X_{mix}$, $Y_{mix}$, $Z_{mix}$) of the XYZ color system in the additive color mixing is a matrix M having three rows and three columns, and is represented as follows.

$$\begin{pmatrix} X_{mix} \\ Y_{mix} \\ Z_{mix} \end{pmatrix} = M \cdot \begin{pmatrix} R \\ G \\ B \end{pmatrix} \qquad \text{[Math. 1]}$$

If introducing the mixing ratios (xr, yr, zr), (xg, yg, zg), and (xb, yb, zb) of each chromaticity when the red, green, and blue images are displayed, the above equation can be expressed as follows by using coefficients mr, mg, and mb for each color.

$$\begin{pmatrix} X_{mix} \\ Y_{mix} \\ Z_{mix} \end{pmatrix} = \begin{pmatrix} mr \cdot xr & mg \cdot xg & mb \cdot xb \\ mr \cdot yr & mg \cdot yg & mb \cdot yb \\ mr \cdot zr & mg \cdot zg & mb \cdot zb \end{pmatrix} \cdot \begin{pmatrix} R \\ G \\ B \end{pmatrix} \qquad \text{[Math. 2]}$$

In consideration of the relation between the chromaticity when a white image is displayed and the ratio (1, 1, 1) of RGB, the coefficient (mr, mg, mb) can be expressed as follows.

$$\begin{pmatrix} mr \\ mg \\ mb \end{pmatrix} = \begin{pmatrix} xr & xg & xb \\ yr & yg & yb \\ zr & zg & zb \end{pmatrix}^{-1} \cdot \begin{pmatrix} x_w/y_w \\ 1 \\ z_w/y_w \end{pmatrix} \qquad \text{[Math. 3]}$$

Here, ($x_w$, $y_w$, $z_w$) is the mixing ratio of the chromaticity when the white color is displayed. When the mixing ratio of the chromaticity acquired in S12 is reflected in the above equation, a coefficient (mr, mg, mb) is obtained. By substituting this value, an additive color mixing matrix specific to the display unit is obtained, and the conversion formula using it is as follows.

$$\begin{pmatrix} X_{mix} \\ Y_{mix} \\ Z_{mix} \end{pmatrix} = \begin{pmatrix} mr_n \cdot Rx_n & mg_n \cdot Gx_n & mb_n \cdot Bx_n \\ mr_n \cdot Ry_n & mg_n \cdot Gy_n & mb_n \cdot By_n \\ mr_n \cdot Rz_n & mg_n \cdot Gz_n & mb_n \cdot Bz_n \end{pmatrix} \cdot \begin{pmatrix} R \\ G \\ B \end{pmatrix} \qquad \text{[Math. 4]}$$

Here, n is the identification number of the display unit, and ($Rx_n$, $Ry_n$, $Rz_n$), ($Gx_n$, $Gy_n$, $Gz_n$), and ($Bx_n$, $By_n$, $Bz_n$) are the chromaticity when monochromatic images of red, green, and blue are displayed by the n-th display unit. Among them, the x and y components ($Rx_n$, $Ry_n$), ($Gx_n$, $Gy_n$), and ($Bx_n$, $By_n$) correspond to the apexes of a triangle representing the color gamut of each display unit in the xy chromaticity diagram. In the following description, the respective apexes are called a red apex, a green apex, and a blue apex in some cases.

After calculating the additive color mixing matrix for the first display unit, the chromaticity information acquisition unit 14 sets the next display unit as the acquisition target of the chromaticity information (S10), and repeats the processing of S12 and S14 (N in S16). When the additive color mixing matrices are obtained for all the display units provided in the head mounted display 100, the loop processing is finished (Y in S16). On the other hand, the color conversion matrix acquisition unit 16 acquires the target value of the white color point in the common color gamut (S18). The target value set in a register, which is not illustrated, or the like in advance may be read, or the target value may be input on the spot by the operator of calibration. For example, in a case of D65 that is the standard light source, the target value is (0.31271, 0.32902, 0.35827).

Next, the color conversion matrix acquisition unit 16 obtains a common color gamut to be the target of the display on the basis of the information on the chromaticity of each display unit obtained in S12 (S20). That is, the color conversion matrix acquisition unit 16 determines the color gamut that all the display units can display as a triangle on the xy chromaticity diagram. The concrete operation method will be described later. Next, the color conversion matrix acquisition unit 16 calculates the additive color mixing matrix of the common color gamut (S22). The operation method may be similar to that in S14, but the chromaticities of the primary colors in this case are the apexes of the triangle determined in S20.

Then, the color conversion matrix acquisition unit 16 calculates and outputs the color conversion matrix for each display unit by using the additive color mixing matrix of each display unit obtained in S14 and the additive color mixing matrix of the common color gamut obtained in S22 (S24). When the additive color mixing matrix of the n-th display unit is An and the additive color mixing matrix of the common color gamut is Acom, the color conversion matrix CMAT_An of the n-th display unit is obtained as follows.

$$\text{CMAT\_An} = An^{-1} \cdot Acom \qquad \text{[Math. 5]}$$

Further, the color conversion matrix acquisition unit 16 calculates a normalization coefficient to be multiplied by the color conversion matrix CMAT_An such that the pixel value (R, G, B) after the color conversion does not exceed the maximum gradation. Specifically, the color conversion matrix acquisition unit 16 calculates the sum of the elements of each row in the color conversion matrix CMAT_An of each display unit. When there are two display units, a total of six sums are calculated. The color conversion matrix acquisition unit 16 selects the maximum value among these sums and multiplies the reciprocal thereof as the normalization coefficient by each element of the color conversion matrix CMAT_An in the above equation. The color conversion matrix acquisition unit 16 outputs the result as the final color conversion matrix in association with the identification information of the display unit.

Figure 11:
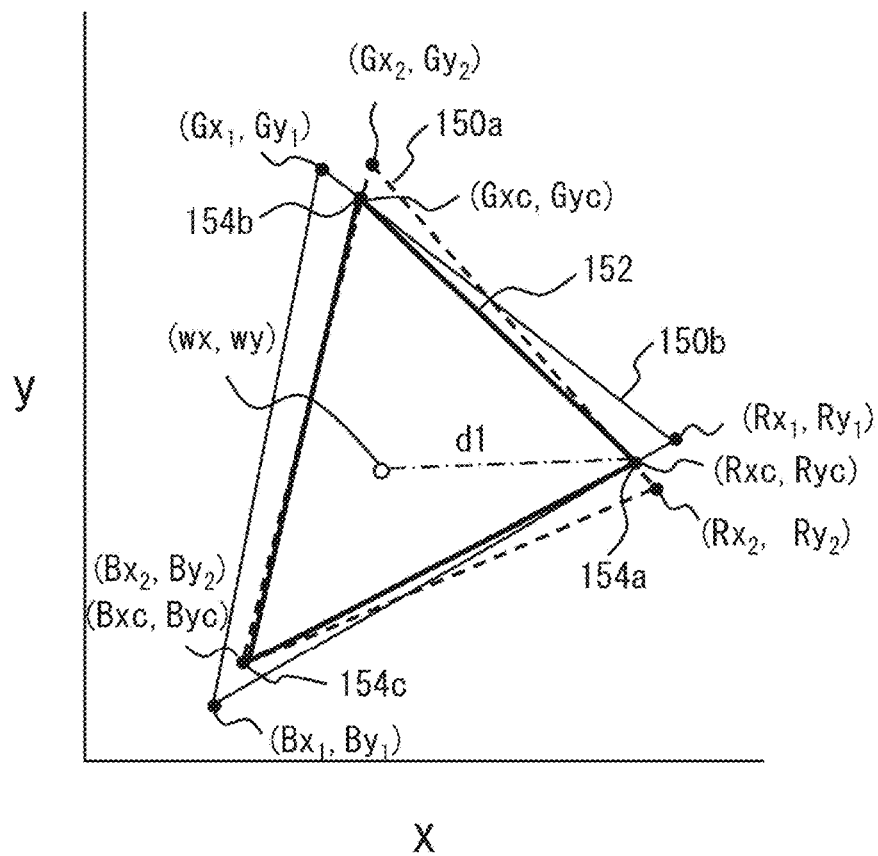
FIG. 11 is a diagram for explaining an example of a method by which a color conversion matrix acquisition unit determines a common color gamut in S20 of FIG. 10.

FIG. 11 is a diagram for explaining an example of a method by which the color conversion matrix acquisition unit 16 determines the common color gamut in S20 of FIG. 10. The drawing exemplifies color gamuts 150a and 150b of the respective display units and a common color gamut 152 determined on the basis thereof in the xy chromaticity diagram. This drawing depicts two color gamuts 150a and 150b by assuming the first display unit 132 and the second display unit 134 provided in the head mounted display 100, but it is obvious that the number of color gamuts on which the common color gamut 152 depends changes according to the number of display units to be combined.

The coordinates of the apexes of the triangles, which are the chromaticities when the single colors of red, green, and blue are displayed, are $(Rx_1, Ry_1)$, $(Gx_1, y_{n1})$, and $(Bx_1, By_1)$ in the color gamut 150a, and are $(Rx_2, Ry_2)$, $(Gx_2, y_{n2})$, and $(Bx_2, By_2)$ in the color gamut 150b. The color conversion matrix acquisition unit 16 determines a color gamut included in the color gamuts 150a and 150b as the common color gamut 152. Rich image representation is preferably realized by making the region as large as possible.

In this context, the derivation method of the common color gamut is not limited, but, as an example, the color conversion matrix acquisition unit 16 determines the point that is the innermost point among the intersection points of the sides of the triangles representing the color gamuts 150a and 150b and is close to the apex, or the apex itself as each of the apexes (Rxc, Ryc), (Gxc, Gyc), and (Bxc, Byc) of the triangle of the common color gamut. Therefore, the color conversion matrix acquisition unit 16 first formulates the sides of the triangles representing the color gamuts 150a and 150b of the respective display units as follows.

$$y_{RG_n} = \frac{Gy_n - Ry_n}{Gx_n - Rx_n}x + Ry_n - Rx_n * \frac{Gy_n - Ry_n}{Gx_n - Rx_n} \quad \text{[Math. 6]}$$
$$= a_{RG_n} * x + b_{RG_n}$$
$$y_{GB_n} = \frac{By_n - Gy_n}{Bx_n - Gx_n}x + Gy_n - Gx_n * \frac{By_n - Gy_n}{Bx_n - Gx_n}$$
$$= a_{GB_n} * x + b_{GB_n}$$
$$y_{BR_n} = \frac{Ry_n - By_n}{Rx_n - Bx_n}x + By_n - Bx_n * \frac{Ry_n - By_n}{Rx_n - Bx_n}$$
$$= a_{BR_n} * x + b_{BR_n}$$

Here, $y_{RGn}$, $y_{GBn}$, and $y_{BRn}$ are the y components of straight lines including the sides between the red apex and the green apex, between the green apex and the blue apex, and between the blue apex and the red apex among the sides of the triangle representing the color gamut of the n-th display unit, and are expressed as a function of the x components. In addition, in the above equation, the inclinations of the straight lines are replaced with $a_{RGn}$, $a_{GBn}$, and $a_{BRn}$, and the y-intercepts are replaced with $b_{RGn}$, $b_{GBn}$, and $b_{BRn}$.

Next, the color conversion matrix acquisition unit 16 obtains the coordinates of the intersection points that are possibly formed in the nearest neighbor of the red, green, and blue apexes among the intersection points of the sides of the two triangles representing the color gamuts 150a and 150b. For example, there is a possibility that the intersection point formed in the nearest neighbor of the red apex is formed between two opposite sides of the two sides sandwiching the red apex $(Rx_1, Ry_1)$ of the color gamut 150a and the two sides sandwiching the red apex $(Rx_2, Ry_2)$ of the color gamut 150b. Therefore, the color conversion matrix acquisition unit 16 derives the coordinates of the intersection points of the sides of the two triangles for the red apex as follows.

$$x1 = \frac{b_{BR2} - b_{RG1}}{a_{RG1} - a_{BR2}}, \quad \text{[Math. 7]}$$
$$y1 = \frac{a_{RG1} * b_{BR2} - a_{BR2} * b_{RG1}}{a_{RG1} - a_{BR2}}$$
$$x2 = \frac{b_{RG2} - b_{BR1}}{a_{BR1} - a_{RG2}},$$
$$y2 = \frac{a_{BR1} * b_{RG2} - a_{RG2} * b_{BR1}}{a_{BR1} - a_{RG2}}$$

Here, (x1, y1) is the coordinate of the intersection point formed between the straight line passing through the red apex and the green apex in the triangle representing the color gamut 150a and the straight line passing through the red apex and the blue apex in the triangle representing the color gamut 150b. (x2, y2) is the coordinate of the intersection point formed between the straight line passing through the red apex and the blue apex in the triangle representing the color gamut 150a and the straight line passing through the red apex and the green apex in the triangle representing the color gamut 150b. Further, the color conversion matrix acquisition unit 16 derives distances d1 and d2 between the coordinates (x1, y1) and (x2, y2) of the intersection points and the target value (wx, wy) of the white color point as follows.

$$d1 = \sqrt{(x1 - wx)^2 + (y1 - wy)^2} \quad \text{[Math. 8]}$$
$$d2 = \sqrt{(x2 - wx)^2 + (y2 - wy)^2}$$

It should be noted that the distance d1 is exemplified in the drawing. The color conversion matrix acquisition unit 16 obtains a distance d3 between the red apex $(Rx_1, Ry_1)$ of the color gamut 150a and the target value of the white color point, and a distance d4 between the red apex $(Rx_2, Ry_2)$ of the color gamut 150b and the target value of the white color point by the similar operation. Then, the color conversion matrix acquisition unit 16 compares d1, d2, d3, and d4 and determines the intersection point or apex closest to the target value of the white color point as the red apex (Rxc, Ryc) of the common color gamut. In the example of the drawing, since an intersection point 154a between the straight line passing through the red apex and the green apex of the color gamut 150a and the straight line passing through the red apex and the blue apex of the color gamut 150b is closest to the target value of the white color point, it is set as the red apex (Rxc, Ryc) of the common color gamut.

The color conversion matrix acquisition unit 16 performs the similar calculation for the green and blue apexes. In the example of the drawing, since an intersection point 154b between the straight line passing through the green apex and the blue apex of the color gamut 150a and the straight line passing through the green apex and the red apex of the color gamut 150b is closest to the target value of the white color point, it is set as the green apex (Gxc, Gyc) of the common color gamut. In addition, in a case of the blue apex, since a blue apex 154c of the color gamut 150a itself is closest to the target value of the white color point, it is set as the blue apex (Bxc, Byc) of the common color gamut.

Figure 12:
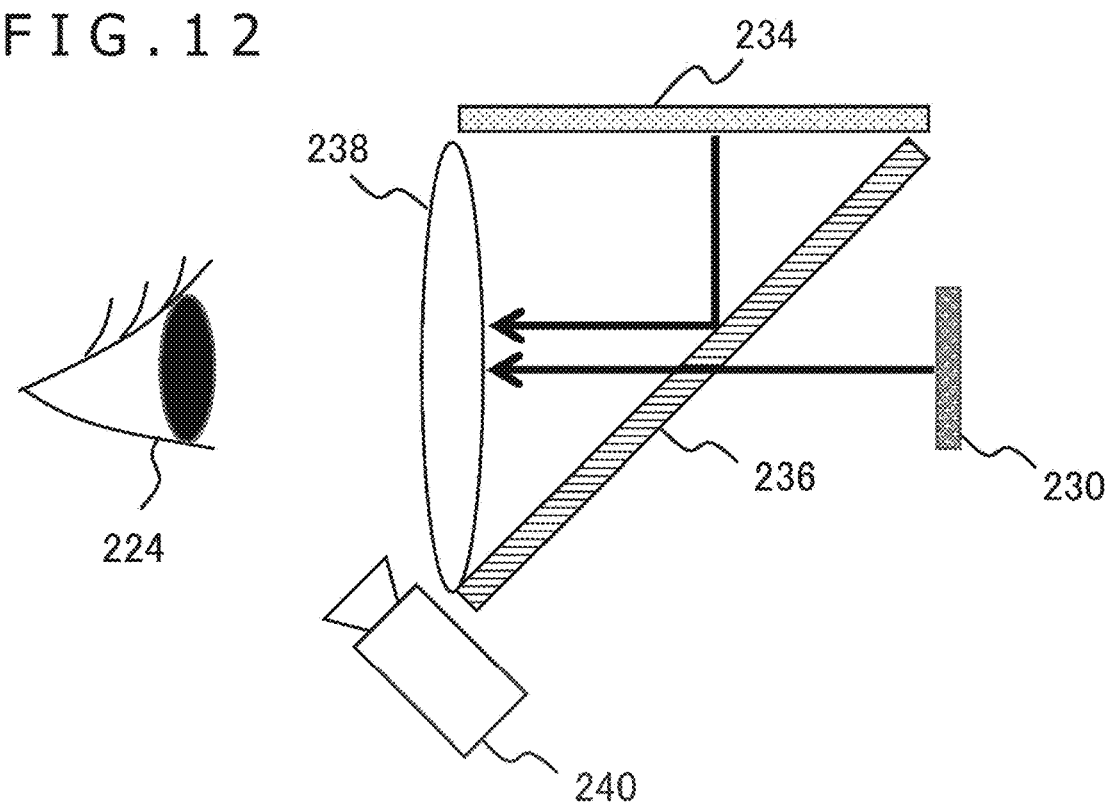
FIG. 12 is a diagram for depicting an example of a structure of a display unit that can use the color conversion matrix in the present embodiment.

FIG. 12 depicts an example of a structure of a display unit that can use a color conversion matrix. The drawing schematically depicts the structure similar to that of FIG. 2 in a cross-sectional view in the vertical direction, and can be, for example, an internal structure of the head mounted display 100. The same applies to FIGS. 16 to 19 to be described later. In a case of this drawing, a display panel 230 for a center image is provided as the first display unit 132, and a display panel 234 for a peripheral image is provided as the second display unit 134. The display panels 230 and 234 convert the original data of the center image and the peripheral image by the color conversion matrix associated with each of them, and display them, respectively.

Light from the display panel 230 for the center image reaches an eye 224 of the user through a half mirror 236 and an eyepiece 238. Light from the display panel 234 for the peripheral image is reflected by the half mirror 236 and reaches the eye 224 of the user through the eyepiece 238. In a case where the two images are combined and visually recognized through the half mirror 236 in this manner, the color tone to be visually recognized is changed according to the position of the pupil of the eye 224 of the user by being affected by the incidence angle dependence of the transmittance and reflectivity of the half mirror 236, and there is a possibility that the boundary of the images is visually recognized after all.

Therefore, the calibration device 10 may acquire a plurality of color conversion matrices to correspond to a state change such as a pupil position. In this case, the head mounted display 100 may, for example, track the position of the pupil on the basis of an image photographed by an eyeball photographing camera 240 of the gaze point detector 130 and select and use the corresponding color conversion matrix. Accordingly, even in a display device in the form of appreciating through an optical system, the colors of the two images can be kept correctly matched regardless of the movement of the pupil.

Figures 13, 14:
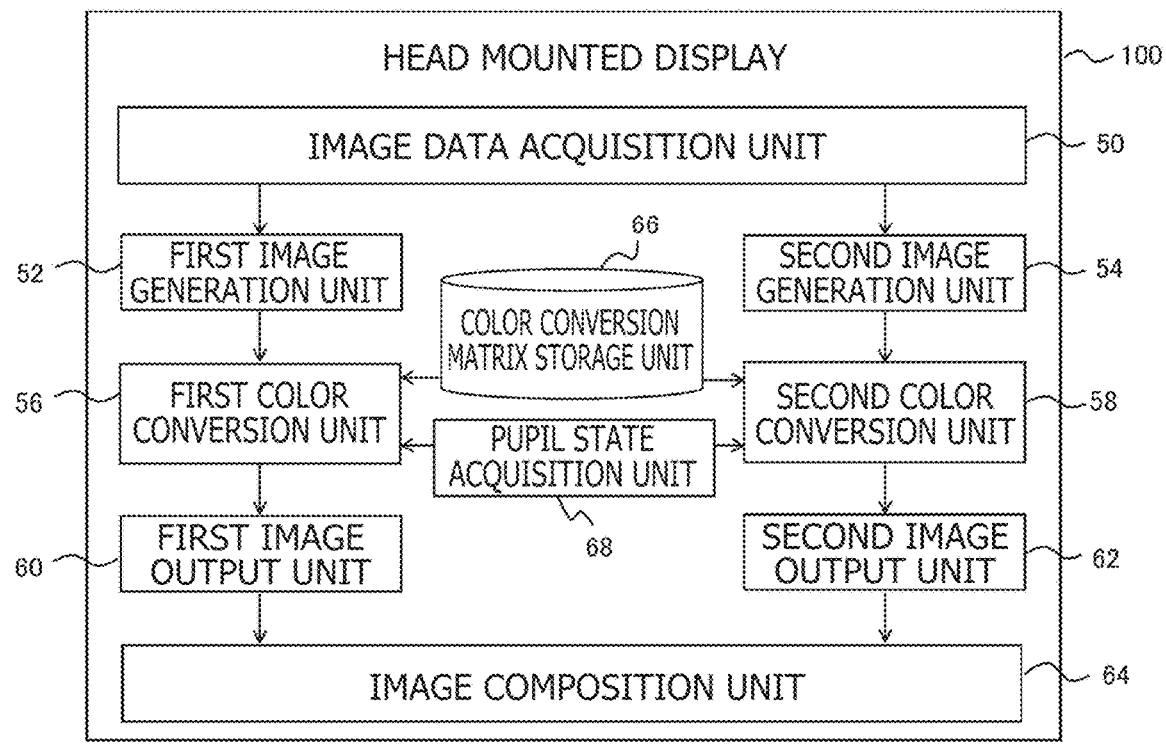
FIG. 13 is a diagram for exemplifying a data structure of the color conversion matrix set in a mode in which the color conversion matrix is switched according to the state of a pupil in the present embodiment.
FIG. 14 is a diagram for depicting a configuration of functional blocks of the head mounted display in the present embodiment.

FIG. 13 exemplifies a data structure of a color conversion matrix set in a mode in which the color conversion matrix is switched according to the state of the pupil. As described above, the color conversion matrix is set for each of the first display unit 132 and the second display unit 134. Here, the first display unit 132 and the second display unit 134 correspond to the display panel 230 for the center image and the display panel 234 for the peripheral image, respectively, in FIG. 12. Further, in this mode, the color conversion matrix of each display unit is set for each of a "first state," a "second state," a "third state," and the like as a "pupil state."

At the time of image display, for example, the first display unit 132 converts the pixel values using the color conversion matrix of "CMAT_A1 (1)" if the pupil is in the "first state" and displays the center image. When the pupil transits from the "first state" to the "second state," the first display unit 132 switches the color conversion matrix from "CMAT_A1 (1)" to "CMAT_A1 (2)" and converts the pixel values. It should be noted that "CMAT_A1 (1)" and the like illustrated in the drawing are identification information of the color conversion matrices, and data of a matrix having three rows and three columns is separately stored as an entity.

The "pupil state" is, for example, information indicating to which region the pupil center belongs when the whole eye is divided into regions. However, if a parameter that can give a change in the appearance of the colors of the images displayed on the first display unit 132 and the second display unit 134 is used, the content thereof is not limited, and may be a range of the gaze point on the screen. In a case where this mode is realized, the chromoscope 92 in the calibration system 90 measures the chromaticity in a plurality of positions and postures corresponding to the pupil state to be set.

In S12 of FIG. 10, the calibration device 10 controls the chromoscope 92 as described above to measure the chromaticities of the primary colors and white color for each display unit. Accordingly, in S14 of FIG. 10, since the additive color mixing matrices of each display unit are obtained as many as the number of pupil states to be set, the subsequent processing is similarly performed for each pupil state. As a result, the color conversion matrix is acquired with the data structure depicted in FIG. 13.

FIG. 14 depicts a configuration of functional blocks of the head mounted display 100 in the present embodiment. The head mounted display 100 includes an image data acquisition unit 50 for acquiring data of an image to be displayed, a first image generation unit 52 for generating a first image, a second image generation unit 54 for generating a second image, a first color conversion unit 56 for converting pixel values of the first image, a second color conversion unit 58 for converting pixel values of the second image, a first image output unit 60 for outputting the converted first image, and a second image output unit 62 for outputting the converted second image.

As depicted in FIG. 1, in a case where one image is divided into the center image and the peripheral image, the "first image" is the center image, and the "second image" is the peripheral image. The head mounted display 100 further includes a color conversion matrix storage unit 66 for storing a color conversion matrix, a pupil state acquisition unit 68 for acquiring the state of the pupil of the user who is viewing the displayed image, and an image composition unit 64 for allowing the first image and the second image to reach the eyes of the user with the first and second images combined.

The image data acquisition unit 50 acquires data necessary for generating a moving image or a still image to be displayed. Here, the content represented by the image is not particularly limited, and may be any of a game image, a movie, a live video, a recorded video, an animation, a photograph, an environmental video, a website, a document, a digital signage, and the like. In addition, the image may be an image photographed by the stereo cameras 110 or an image obtained by processing the image or drawing a virtual object. Depending on the content of such an image, the image data acquisition unit 50 may acquire data from various acquisition destinations.

For example, the image data acquisition unit 50 may acquire moving image data to be streamed by an external image generation device or a server, or may draw or reproduce an image by using data stored in an internal storage device. The first image generation unit 52 includes the GPU 122 depicted in FIG. 6, and generates the first image by acquiring necessary data from the image data acquisition unit 50. The second image generation unit 54 also includes the GPU 122, and generates the second image by acquiring necessary data from the image data acquisition unit 50.

The first color conversion unit 56 reads the color conversion matrix associated with the display unit (for example, the first display unit 132) of the display destination from the color conversion matrix storage unit 66, and converts the pixel values of the first image. The second color conversion unit 58 reads the color conversion matrix associated with the display unit (for example, the second display unit 134) of the display destination from the color conversion matrix storage unit 66, and converts the pixel values of the second image.

Therefore, the color conversion matrix storage unit 66 stores in advance the data of the color conversion matrix acquired by the calibration device 10.

The pupil state acquisition unit 68 includes the camera of the gaze point detector 130 depicted in FIG. 6, and acquires the state of the pupil of the user who is viewing the display image at a predetermined rate. It should be noted that, in the present embodiment, the display image may be an image that is in the field of view of the user and the projection of the laser beam is also defined as "display." As described above, the first color conversion unit 56 and the second color conversion unit 58 switch and use the color conversion matrix according to the state of the pupil. However, the present embodiment is not limited thereto, and the color conversion matrix may be fixed for each display unit regardless of the state of the pupil. In this case, the function of the pupil state acquisition unit 68 can be omitted.

The first image output unit 60 includes the first display unit 132 depicted in FIG. 6, and displays the first image with the pixel values converted. The second image output unit 62 includes the second display unit 134 depicted in FIG. 6, and displays the second image with the pixel values converted. In a case where the peripheral image excluding the center region is displayed on the display panel as the second image, the center region does not need to emit light. The image composition unit 64 is an optical system that combines the displayed first image and second image so as to reach the eyes as one image.

That is, the image composition unit 64 is a hardware structure that displays the first image and the second image by combining them without deviation, and an example of this is the structure including the half mirror depicted in FIG. 2 and FIG. 12. However, the image composition unit 64 may take various forms according to the positional relation between the first display unit 132 and the second display unit 134, the arrangement required for the gaze point detector 130, and the like. Specific examples will be described later.

Figure 15:
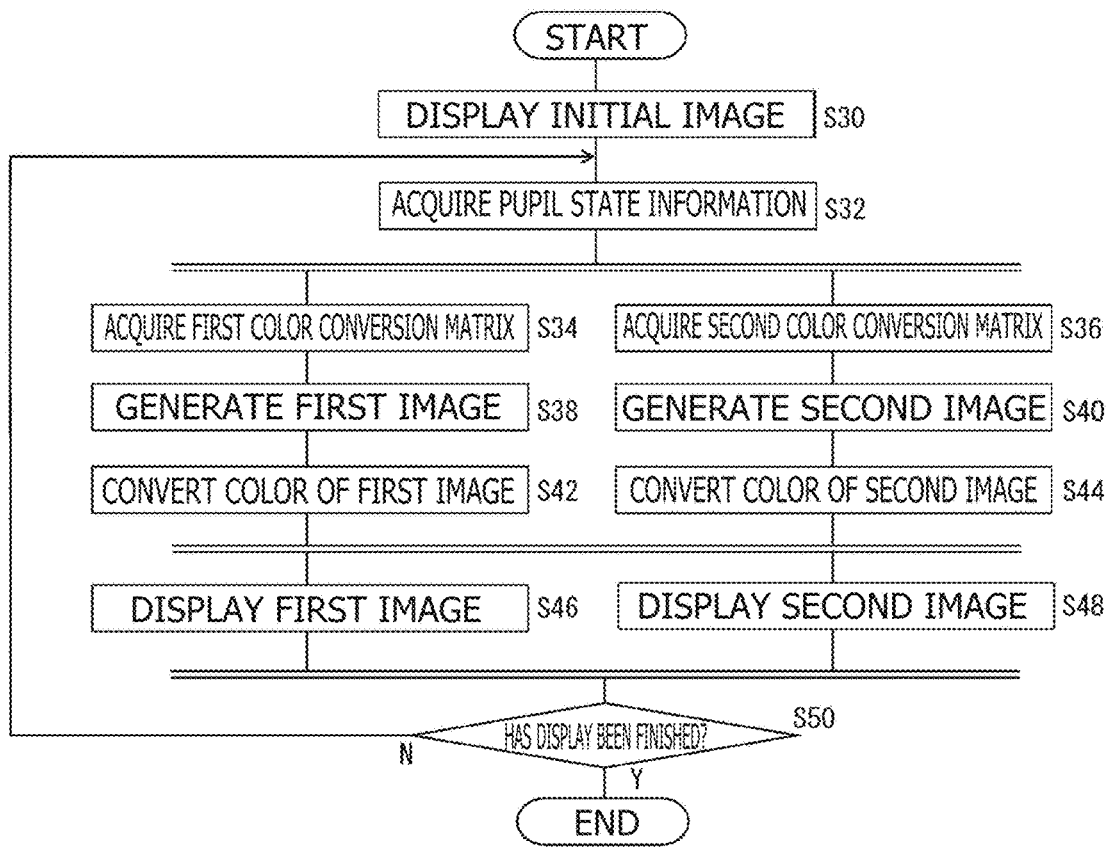
FIG. 15 is a flowchart for depicting a processing procedure in which the head mounted display displays an image in the present embodiment.

FIG. 15 is a flowchart for depicting a processing procedure in which the head mounted display 100 displays an image in the present embodiment. The flowchart is started after the user wears the head mounted display 100 and selects the content to be displayed through an input device that is not illustrated. In response to this, the image data acquisition unit 50 starts image data acquisition of the content. It should be noted that the head mounted display 100 may internally perform information processing such as a game, or establish communication with an external device to request image data, but display processing of an image is particularly depicted in the drawing.

First, the head mounted display 100 displays an initial image of the content (S30). The initial image may also be the image obtained by combining the first image displayed by the first image output unit 60 and the second image displayed by the second image output unit 62. In the mode of switching the color conversion matrix according to the state of the pupil, the pupil state acquisition unit 68 acquires predetermined state information such as the position of the pupil on the basis of the photographed image of the eyes of the user (S32). Then, the first color conversion unit 56 and the second color conversion unit 58 read the color conversion matrices (the first conversion matrix and the second conversion matrix, respectively) corresponding to the state of the pupil and corresponding to the display units of the display destinations from the color conversion matrix storage unit 66 (S34 and S36).

On the other hand, the first image generation unit 52 generates the first image (S38), and in parallel with this, the second image generation unit 54 generates the second image (S40). Subsequently, the first color conversion unit 56 converts the pixel values of the first image by the first color conversion matrix acquired in S34 (S42), and in parallel with this, the second color conversion unit 58 converts the pixel values of the second image by the second color conversion matrix acquired in S36 (S44). Then, the first image output unit 60 and the second image output unit 62 display the first image and the second image after conversion, respectively (S46 and S48).

The first image and the second image are combined by the image composition unit 64 and reach the eyes of the user. During a period in which it is not necessary to finish the display, such as when a user operation to finish the display of the content is performed, the processing from S32 to S48 is repeated (N in S50). When it becomes necessary to finish the display, all the processing is finished (Y in S50).

Figure 16:
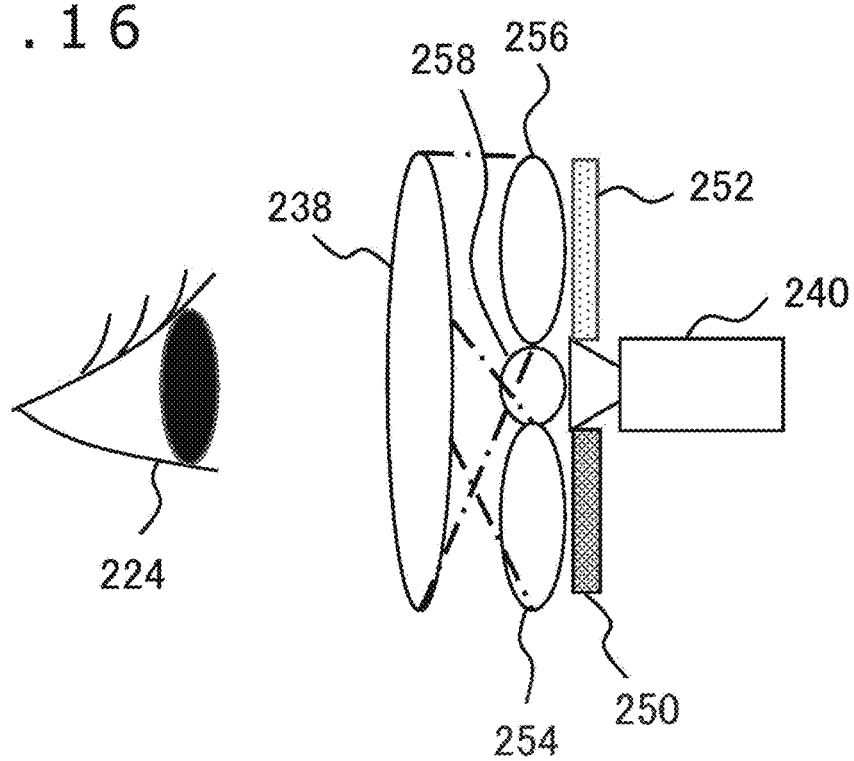
FIG. 16 is a diagram for depicting an example of a structure of an image composition unit in a case where an optical system having a free curved surface is introduced in the present embodiment.

Next, a modified example of the structure in which the center image and the peripheral image as the first image and the second image are combined for visual recognition will be described. FIG. 16 depicts an example of a structure of an image composition unit 64 in a case where an optical system having a free curved surface is introduced. In this configuration, a display panel 250 for a center image that is the first display unit 132 and a display panel 252 for a peripheral image that is the second display unit 134 are arranged on substantially the same plane, and each image is guided in an appropriate direction by an optical system 254 for a center image and an optical system 256 for a peripheral image to realize image composition.

A method of introducing the optical system having the free curved surface into the head mounted display and guiding images displayed on a plurality of displays to appropriate positions by reflection or refraction to be visually recognized as one image is disclosed in, for example, PCT Patent Publication No. WO2019/147946 and the like. According to this configuration, the head mounted display 100 can be downsized as compared with projection of two kinds of images from different directions. In addition, since an optical path can be designed relatively freely, the degree of freedom in the arrangement of the eyeball photographing camera 240 can be increased.

For example, as illustrated in the drawing, by arranging the display panel 250 for the center image, the display panel 252 for the peripheral image, and the respective optical systems 254 and 256 so as to avoid the front of the eye 224, an eyeball photographing optical system 258 and the eyeball photographing camera 240 can be arranged in front of the eye 224. Accordingly, the state of the pupil and the gaze point can be easily detected. It should be noted that, depending on the design of the optical system 254 for the center image and the optical system 256 for the peripheral image, the positions and postures of the display panel 250 for the center image and the display panel 252 for the peripheral image may be variously changed.

Figure 17:
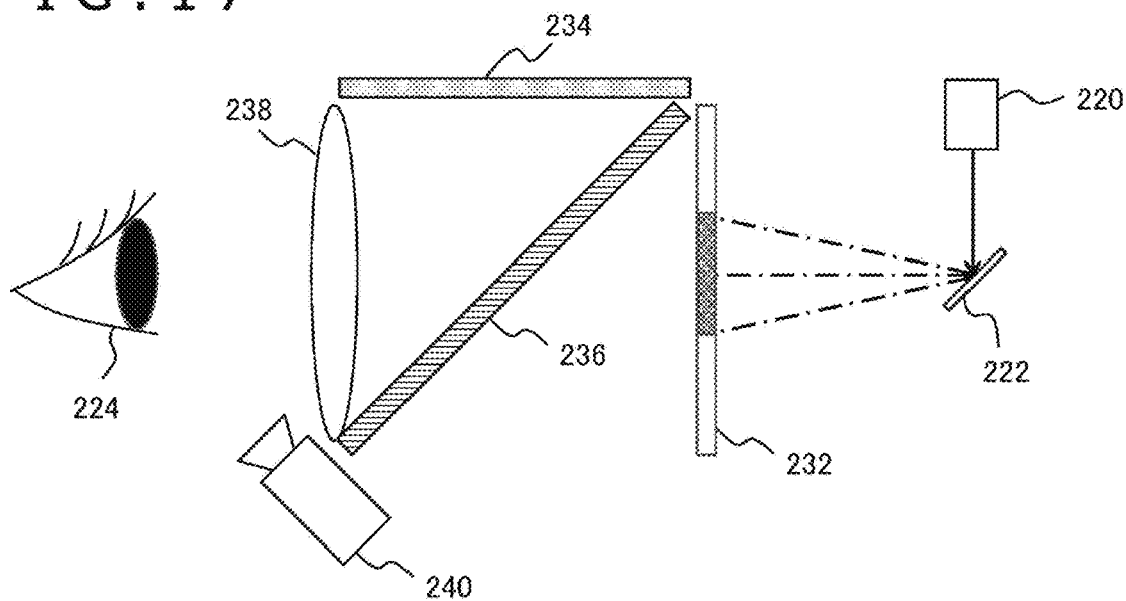
FIG. 17 is a diagram for depicting an example of a structure of an image composition unit in a case where a laser scanning system is introduced in the present embodiment.

FIG. 17 depicts an example of a structure of an image composition unit 64 in a case where a laser scanning system is introduced. In this configuration, a laser light source 220, a mirror 222, and a screen 232 for a center image are provided as the first display unit 132. The screen 232 for the center image is formed of a member that allows incident light to diffuse and pass through. On the other hand, a display panel 234 for a peripheral image is provided as the second display unit 134.

A small-sized projector for projecting an image onto an external screen or the like by two-dimensionally scanning laser light corresponding to a pixel by using the mirror 222 for deflection has been put into practical use (see, for example, Japanese Patent Laid-open No. 2017-83657). The first display unit 132 illustrated in the drawing may have the similar principle, and outputs laser light containing red, blue, and green components corresponding to pixel values from the laser light source 220, and reflects the laser light by the mirror 222 swinging about two axes so that the laser light is two-dimensionally scanned on the screen 232 for the center image. Accordingly, an image having laser light output at each time as a pixel is formed.

As the mirror 222, for example, a MEMS (Micro Electro Mechanical Systems) mirror is introduced. The MEMS mirror is a small-sized and low-power-consumption device capable of precisely controlling an angle change around two axes by electromagnetic drive. However, the driving method of the mirror is not particularly limited. Other configurations are similar to those depicted in FIG. 12. That is, the center image and the peripheral image are combined by the half mirror 236 arranged in such a manner that the angle formed by the screen 232 for the center image and the display panel 234 for the peripheral image is 90° and the half mirror 236 is arranged in the middle thereof to have an angel of 45° with each other.

It should be noted that the position relation between the first display unit 132 and the second display unit 134 may be reversed, the laser light from the mirror 222 may be reflected by the half mirror 236, and the light from the display panel 234 for the peripheral image may be allowed to pass through to reach the eye 224. In addition, instead of the display panel 234 for the peripheral image, the peripheral image may be displayed by a laser scanning system similar to the center image.

Figure 18:
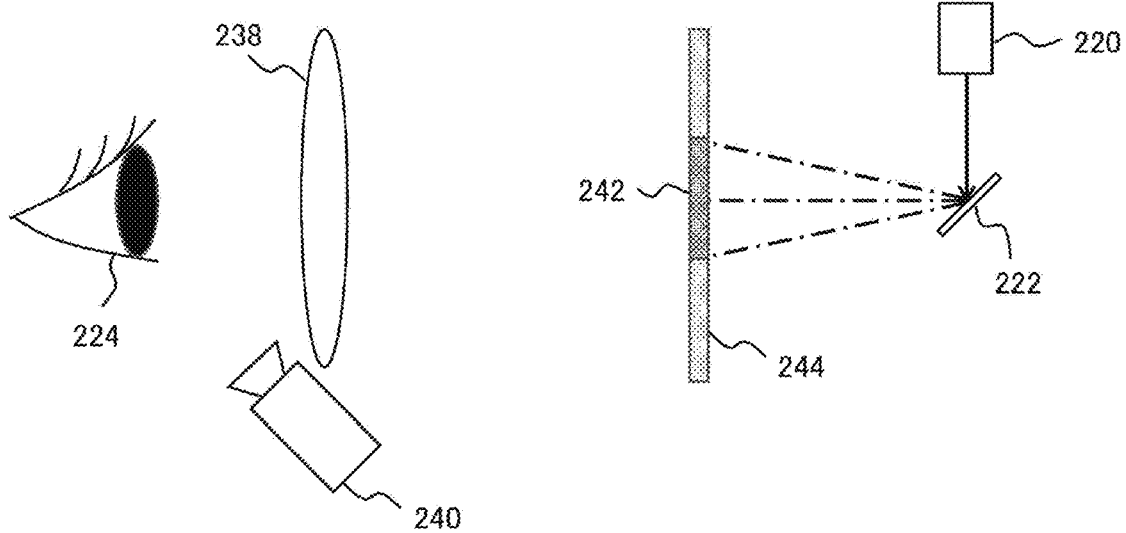
FIG. 18 is a diagram for depicting another example of a structure of the image composition unit in the case where the laser scanning system is introduced in the present embodiment.

FIG. 18 depicts another example of a structure of the image composition unit 64 in the case where the laser scanning system is introduced. This configuration is different from FIG. 17 in that a screen 242 for a center image that allows laser light to diffuse and pass through is provided integrally with a display panel 244 for a peripheral image and that a half mirror is not provided. A light transmissive display capable of allowing light from a background to pass through in a region (non-display region) of a display panel where no image is displayed has been known (see, for example, PCT Patent Publication No. WO2014/010585). By applying this to the present embodiment, the display panel 244 for the peripheral image is configured by using a translucent material for the base material of the light transmissive display.

Accordingly, a region of the display panel 244 for the peripheral image where no peripheral image is displayed can be used as the screen 242 for the center image that allows the laser light reflected by the mirror 222 to diffuse and pass through. It should be noted that, in this case, a part of the first image output unit 60 and the second image output unit 62 also serves as the image composition unit 64. With such a configuration, the optical system can be simplified as compared with projection of two kinds of images from different directions.

Figure 19:
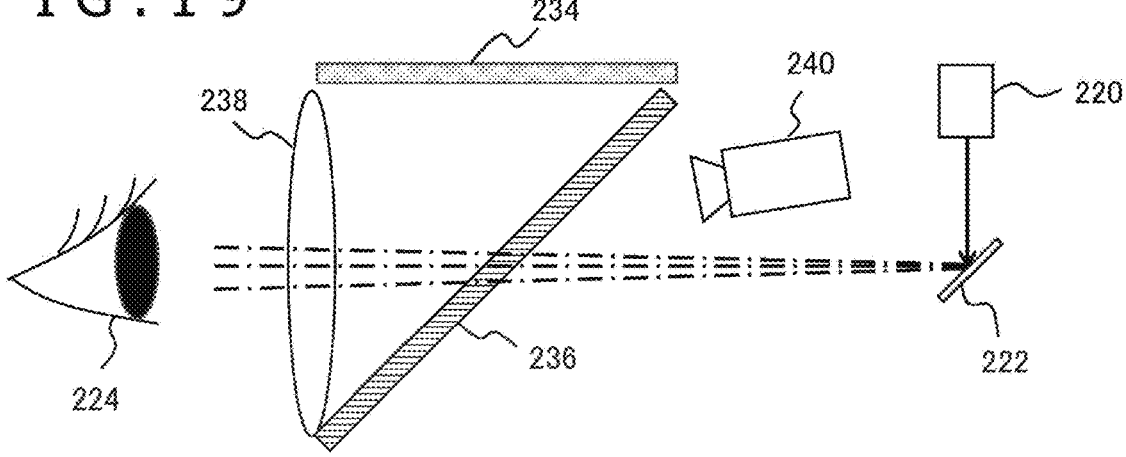
FIG. 19 is a diagram for depicting yet another example of a structure of the image composition unit in the case where the laser scanning system is introduced in the present embodiment.

FIG. 19 depicts yet another example of a structure of the image composition unit 64 in the case where the laser scanning system is introduced. This configuration is different from FIG. 17 in that the screen for the center image is not provided and an image formed of laser light is directly projected onto the retinas of the user. The technique for converging laser light onto the pupils of the user and projecting an image onto the retinas by the principle of the Maxwell vision is mainly being applied to a wearable display (see, for example, PCT Patent Publication No. WO2009/066465). The first display unit 132 illustrated in the drawing may also have the similar principle, and controls the operation and the like of the mirror 222 such that the original object is visually recognized when laser light is converged by the pupils and imaged onto the retinas.

However, in the present embodiment, by projecting the center image through the half mirror 236, the center image is combined with the peripheral image displayed for visual recognition by the display panel 234 for the peripheral image and reflected by the half mirror 236. It should be noted that, in this case, since the screen for the center image is not provided, the degree of freedom in the arrangement of the eyeball photographing camera 240 is increased. For example, as illustrated in the drawing, the eyeball can be photographed from the vicinity of the front through the half mirror 236.

As depicted in FIGS. 16 to 19, there are various methods for combining and displaying a plurality of individually-displayed images. In any case, the calibration device 10 calculates a color conversion matrix by using the information on the chromaticity measured from the position corresponding to the eye 224 of the user. Accordingly, the visual colors of the plurality of images can be similarly matched by any structure.

According to the present embodiment described above, a plurality of display mechanisms is provided in the display device, and partial images obtained by dividing one image into a plurality of regions are individually displayed and then combined for visual recognition. At this time, the display device converts pixel values by the color conversion matrix specific to the display mechanism and displays them. Therefore, the calibration device acquires the color gamuts in the xy chromaticity diagram for all the display mechanisms, and calculates the color conversion matrix so that the colors in the common color gamut included therein are visually recognized.

Accordingly, the color tones of the appearance of the partial images can be unified, and the discomfort caused by the individual display, such as the boundary line being conspicuous, can be suppressed. In particular, in the case of the head mounted display, since the image enlarged by the eyepiece is appreciated from a viewpoint close to the display image, the contribution of the image quality to the impression becomes remarkable even when the color tone is finely adjusted.

For example, in the head mounted display, an image of a center part is displayed by a display mechanism capable of displaying with high resolution, and an image of a peripheral part is displayed by a display mechanism capable of displaying with a wide angle of view. Since the color tones are unified by the color conversion matrix, the user can obtain presence by the image with a wide angle of view while viewing a high-definition image by the center fovea that is excellent in the visual function without discomfort. As a result, while the quality of the image felt by the user is maintained, the processing and transmission loads are reduced, and the image display with a low delay can be realized.

In addition, even in a case where a plurality of display mechanisms is arranged to form a large screen, which is not limited to the head mounted display, the color tones can be unified regardless of the number or format of the display mechanisms, so that easy expansion is possible. Further, since it is possible to visually recognize a composite image without discomfort even if the display mechanism is divided, it is possible to optimize the performance of the display mechanism according to the position of the partial image or to partially make the display format different, so that a display system that meets the needs in terms of both image quality and cost can be constructed according to circumstances.

The present invention has been described above on the basis of the embodiment. It will be appreciated by those skilled in the art that the above embodiment is illustrative, various modified examples are possible in combinations of these constitutional elements and processing processes, and such modified examples are within the scope of the present invention.

INDUSTRIAL APPLICABILITY

As described above, the present invention can be used in a display device such as a head mounted display, a calibration device, a calibration system, an image display system, and the like.

REFERENCE SIGNS LIST

10: Calibration device
12: Display control unit
14: Chromaticity information acquisition unit
16: Color conversion matrix acquisition unit
18: Output unit
22: CPU
24: GPU
26: Main memory
50: Image data acquisition unit
52: First image generation unit
54: Second image generation unit
56: First color conversion unit
58: Second color conversion unit
60: First image output unit
62: Second image output unit
64: Image composition unit
66: Color conversion matrix storage unit
68: Pupil state acquisition unit
90: Calibration system
92: Chromoscope
100: Head mounted display
110: Stereo camera
120: CPU
122: GPU
124: Main memory
130: Gaze point detector
132: First display unit
134: Second display unit

The invention claimed is:

1. A calibration device that performs calibration of a display device for individually displaying partial images obtained by dividing a display image into regions and combining them for visual recognition, the calibration device comprising:
a processor; and
a memory coupled to the processor, the memory including instructions that, when executed by the processor, cause the processor to:
acquire chromaticity information for each of a plurality of display mechanisms of the display device that displays the partial images, wherein the chromaticity information for each of the plurality of display mechanisms is represented by respective triangular color gamuts in a two-dimensional (2D) chromaticity coordinate system, and wherein each apex of respective triangular color gamuts represent a chromaticity of a primary color;
determine a common color gamut included within the respective triangular color gamuts of the plurality of display mechanisms on a basis of based on the chromaticity information of each display mechanism, wherein determining the common color gamut includes selecting apexes of a triangle representing the common color gamut positioned within each respective triangular color gamuts that maximize a triangular region of the common color gamut in the 2D chromaticity coordinate system;
acquire, for each of the plurality of display mechanisms, a respective color conversion matrix for converting pixel values of image data such that the partial images are represented by the common color gamut; and
output each respective color conversion matrix associated with each of the plurality of display mechanisms.

2. The calibration device according to claim 1, wherein the chromaticity information is measured at a position corresponding to a viewpoint of a user who views the display image.

3. The calibration device according to claim 2, wherein the processor is further configured to:
acquire the chromaticity information measured at positions corresponding to a plurality of viewpoints, and
acquire the respective color conversion matrix for each of the plurality of display mechanisms that differs depending on the viewpoint for each of the display mechanisms.

4. The calibration device according to claim 1, wherein the plurality of display mechanisms are provided in a head mounted display of the display device, wherein the calibration device further comprises:
a chromoscope fixed at a position corresponding to a viewpoint of a user when the user wears the head mounted display, wherein the chromoscope is configured to acquire the chromaticity information for each of the plurality of display mechanisms.

5. The calibration device according to claim 1, wherein the processor is further configured to:
obtain the chromaticity information of each of the plurality of display mechanisms by measuring light having passed through or been reflected by an optical system of the display device for combining the partial images.

6. The calibration device according to claim 1, wherein determining the common color gamut further comprises:
selecting, by the processor, a point within the 2D chromaticity coordinate system having a smallest distance to a target value of a white color point among apexes of the respective triangular color gamuts and intersection points of straight lines passing through the apexes of the respective triangular color gamuts as each of the apexes of the triangle representing the common color gamut.

7. A display device that individually displays partial images obtained by dividing a display image into regions and combining them for visual recognition, the device comprising:
a plurality of display mechanisms;
a processor; and
a memory coupled to the processor, the memory including instructions that, when executed by the processor, cause the processor to:

store a color conversion matrix for converting pixel values of image data in association with a display mechanism such that the partial images are represented by a common color gamut included within respective triangular color gamuts of the plurality of display mechanisms of the display device, wherein the common color gamut is generated by selecting apexes of a triangle representing the common color gamut positioned within each respective triangular color gamuts that maximize a triangular region of the common color gamut in a 2D chromaticity coordinate system;

convert pixel values of data of the partial images by using the color conversion matrix associated with the display mechanism; and output, for display on a corresponding display mechanism, the partial images with pixel values of data converted.

8. The display device according to claim 7, further comprising wherein the processor is further configured to:

acquire a state of a pupil of a user who is viewing a displayed image on a basis of a photographed image, wherein switch the color conversion matrix according to a change in the state of the pupil.

9. The display device of claim 7, wherein chromaticity information of the display device is measured at a position corresponding to a viewpoint of a user who views the display image.

10. A calibration method of a calibration device that performs calibration of a display device for individually displaying partial images obtained by dividing a display image into regions and combining them for visual recognition, the method comprising:

acquiring chromaticity information for each of a plurality of display mechanisms of the display device that displays the partial images, wherein the chromaticity information for each of the plurality of display mechanisms is represented by respective triangular color gamuts in a two-dimensional (2D) chromaticity coordinate system, and wherein each apex of respective triangular color gamuts represent a chromaticity of a primary color;

determining a common color gamut included within the respective triangular color gamuts of the plurality of display mechanisms based on the chromaticity information of each display mechanism, wherein determining the common color gamut includes selecting apexes of a triangle representing the common color gamut positioned within each respective triangular color gamuts that maximize a triangular region of the common color gamut in the 2D chromaticity coordinate system;

acquiring, for each of the plurality of display mechanisms, a respective color conversion matrix for converting pixel values of image data such that the partial images are represented by the common color gamut; and outputting each respective color conversion matrix associated with each of the plurality of display mechanisms.

11. The calibration method of claim 10, wherein acquiring chromaticity information comprises measuring the chromaticity information at a position corresponding to a viewpoint of a user who views the display image.

12. The calibration method of claim 10, wherein determining the common color gamut further comprises:

selecting, by a processor, a point within the 2D chromaticity coordinate system having a smallest distance to a target value of a white color point among apexes of the respective triangular color gamuts and intersection points of straight lines passing through the apexes of the respective triangular color gamuts as each of the apexes of the triangle representing the common color gamut.

13. An image display method of a display device that individually displays partial images obtained by dividing a display image into regions and combining them for visual recognition, the method comprising:

reading, from a storage unit, a color conversion matrix associated with a display mechanism of a plurality of display mechanisms;

converting pixel values of image data in association with the display mechanism such that the partial images are represented by a common color gamut included within respective triangular color gamuts of a plurality of display mechanisms of the display device, wherein the common color gamut is generated by selecting apexes of a triangle representing the common color gamut positioned within each respective triangular color gamuts that maximize a triangular region of the common color gamut in a 2D chromaticity coordinate system; and output, for display on a corresponding display mechanism, the partial images with pixel values of data converted.

14. The image display method of claim 13, wherein chromaticity information of the display device is measured at a position corresponding to a viewpoint of a user who views the display image.

15. A non-transitory, computer readable storage medium containing a computer program, which when executed by a computer, causes the computer to perform a method for calibrating a display device for individually displaying partial images obtained by dividing a display image into regions and combining them for visual recognition, by carrying out actions, comprising:

acquiring chromaticity information for each of a plurality of display mechanisms of the display device that displays the partial images, wherein the chromaticity information for each of the plurality of display mechanisms is represented by respective triangular color gamuts in a two-dimensional (2D) chromaticity coordinate system, and wherein each apex of respective triangular color gamuts represent a chromaticity of a primary color;

determining a common color gamut included within the respective triangular color gamuts of the plurality of display mechanisms based on the chromaticity information of each display mechanism, wherein determining the common color gamut includes selecting apexes of a triangle representing the common color gamut positioned within each respective triangular color gamuts that maximize a triangular region of the common color gamut in the 2D chromaticity coordinate system;

acquiring, for each of the plurality of display mechanisms, a respective color conversion matrix for converting pixel values of image data such that the partial images are represented by the common color gamut; and outputting each respective color conversion matrix associated with each of the plurality of display mechanisms.

16. The non-transitory, computer readable storage medium of claim 15, wherein acquiring chromaticity information comprises measuring the chromaticity information at a position corresponding to a viewpoint of a user who views the display image.

17. The non-transitory, computer readable storage medium of claim 15, wherein determining the common color gamut further comprises:

selecting, by the computer, a point within the 2D chromaticity coordinate system having a smallest distance to a target value of a white color point among apexes of the respective triangular color gamuts and intersection points of straight lines passing through the apexes of the respective triangular color gamuts as each of the apexes of the triangle representing the common color gamut.

18. A non-transitory, computer readable storage medium containing a computer program, which when executed by a computer, causes the computer to cause a display device to individually display partial images obtained by dividing a display image into regions and combining them for visual recognition by carrying out actions, comprising:

reading, from a storage unit, a color conversion matrix associated with a display mechanism of a plurality of display mechanisms;

converting pixel values of image data in association with the display mechanism such that the partial images are represented by a common color gamut included within respective triangular color gamuts of a plurality of display mechanisms of the display device, wherein the common color gamut is generated by selecting apexes of a triangle representing the common color gamut positioned within each respective triangular color gamuts that maximize a triangular region of the common color gamut in a 2D chromaticity coordinate system; and output, for display on a corresponding display mechanism, the partial images with pixel values of data converted.

19. The non-transitory, computer readable storage medium of claim 18, wherein chromaticity information of the display device is measured at a position corresponding to a viewpoint of a user who views the display image.

20. The non-transitory, computer readable storage medium of claim 18, wherein the common color gamut is further generated by:

selecting, by the computer, a point within the 2D chromaticity coordinate system having a smallest distance to a target value of a white color point among apexes of the respective triangular color gamuts and intersection points of straight lines passing through the apexes of the respective triangular color gamuts as each of the apexes of the triangle representing the common color gamut.

* * * * *